United States Patent [19]

Azmoodeh et al.

[11] Patent Number: 5,742,783
[45] Date of Patent: Apr. 21, 1998

[54] SYSTEM FOR GROUPING INSTRUCTIONS FOR MULTIPLE ISSUE USING PLURAL DECODERS HAVING FORWARD AND BACKWARD PROPAGATION OF DECODING INFORMATION

[75] Inventors: Saeid Azmoodeh; Peter Malcolm Keith Boffey; Richard Matthew Forsyth; Brian Jeremy Parsons, all of Bristol, England

[73] Assignee: Inmos Limited, England

[21] Appl. No.: 293,574

[22] Filed: Aug. 22, 1994

Related U.S. Application Data

[63] Continuation of Ser. No. 809,966, Dec. 18, 1991, abandoned.

[30] Foreign Application Priority Data

Dec. 21, 1990 [GB] United Kingdom .............. 9027853

[51] Int. Cl.[6] .................................................. G06F 9/30
[52] U.S. Cl. ........................................ 395/388; 395/391
[58] Field of Search .......................... 395/375, 800, 395/390, 391, 388, 384

[56] References Cited

U.S. PATENT DOCUMENTS

| | | | |
|---|---|---|---|
| 4,128,880 | 12/1978 | Cray, Jr. .......................... | 395/800 |
| 4,476,525 | 10/1984 | Ishii ................................ | 395/375 |
| 4,847,755 | 7/1989 | Morrison et al. ................. | 395/800 |
| 4,890,218 | 12/1989 | Bram ............................... | 395/386 |
| 4,903,196 | 2/1990 | Pomerene et al. ................ | 395/375 |
| 5,197,137 | 3/1993 | Kumar et al. ..................... | 395/375 |
| 5,203,002 | 4/1993 | Wetzel ............................. | 395/375 |
| 5,214,763 | 5/1993 | Blaner et al. .................... | 395/375 |
| 5,293,500 | 3/1994 | Ishida et al. ..................... | 395/375 |

FOREIGN PATENT DOCUMENTS

| | | |
|---|---|---|
| 0 381 471 A2 | 8/1990 | European Pat. Off. |
| 0 449 661 A2 | 10/1991 | European Pat. Off. |
| 0 454 985 A2 | 11/1991 | European Pat. Off. |
| 0 455 966 A2 | 11/1991 | European Pat. Off. |

OTHER PUBLICATIONS

L. Kohn et al., *Introducing the Intel i860 64–Bit Microprocessor;* IEEE Micro, pp. 15–30 (Aug. 1989).

S. McGready, *The i960CA SuperScalar Implementation of the 80960 Architecture*, Wescon/89 Conference, pp. 628–637 (Nov. 14, 1989).

R. Groves et al., *RISC System/6000 Processor Architecture*, Microprocessors and Microsystems, vol. 14, No. 6, pp. 357–377 (Aug. 1990).

*Primary Examiner*—Richard L. Ellis
*Attorney, Agent, or Firm*—McDermott, Will & Emery

[57] ABSTRACT

Computer appratus includes an instruction execution unit (13) having a plurality of functional units (14,16) each arranged to execute at least part of an instruction and instruction issuing circuitry (10,12) for issuing simultaneously a group of separate compatible instructions to the execution unit (13) the circuitry (12) having means for classifying each instruction in dependence on the or each functional unit required for execution of that instruction and means for testing the classification of successive instructions and selecting a group which according to their classification are compatible for simultaneous issue to the execution unit (13) without conflicting demands on any function unit (14,16) in the execution unit.

20 Claims, 18 Drawing Sheets

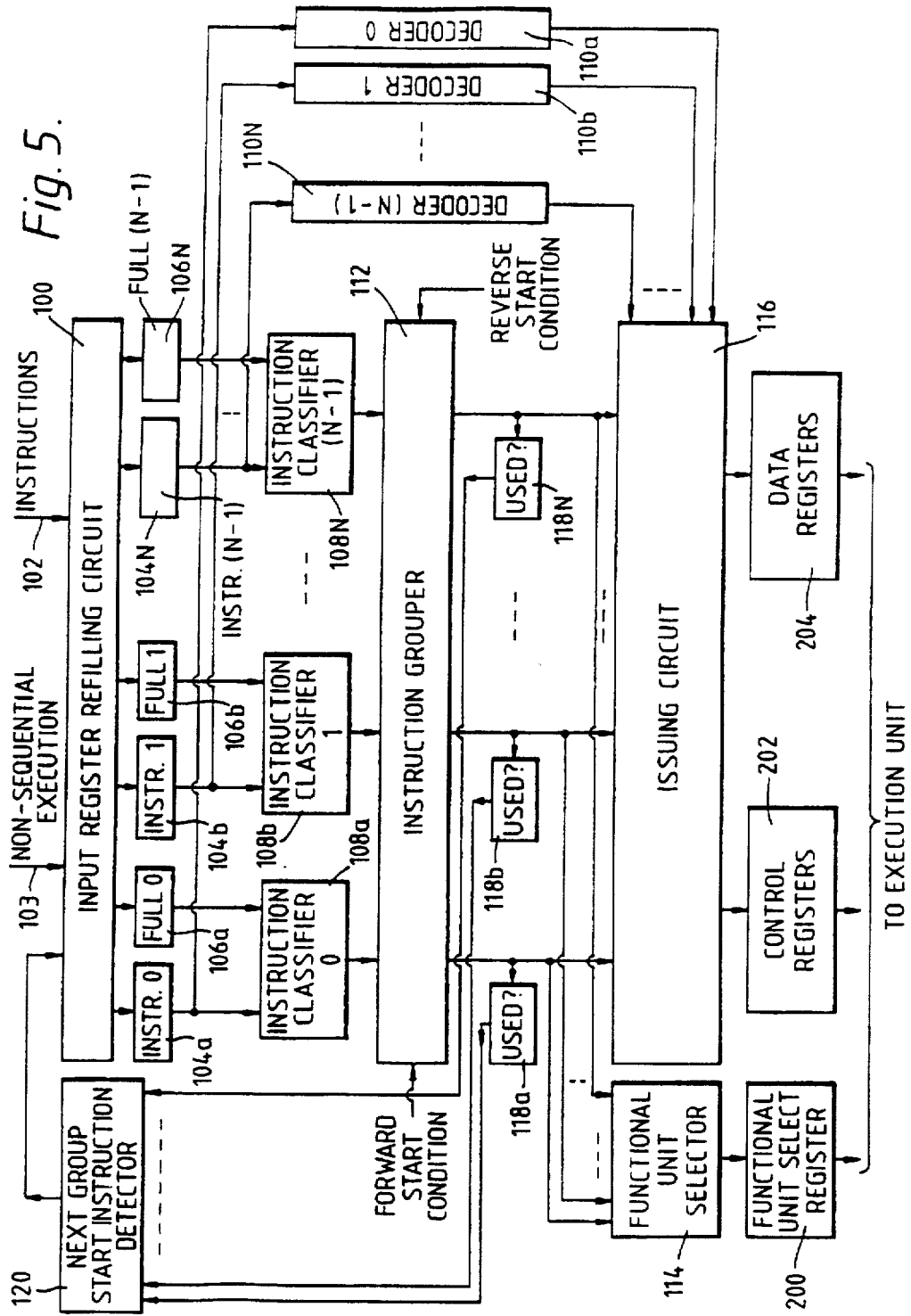

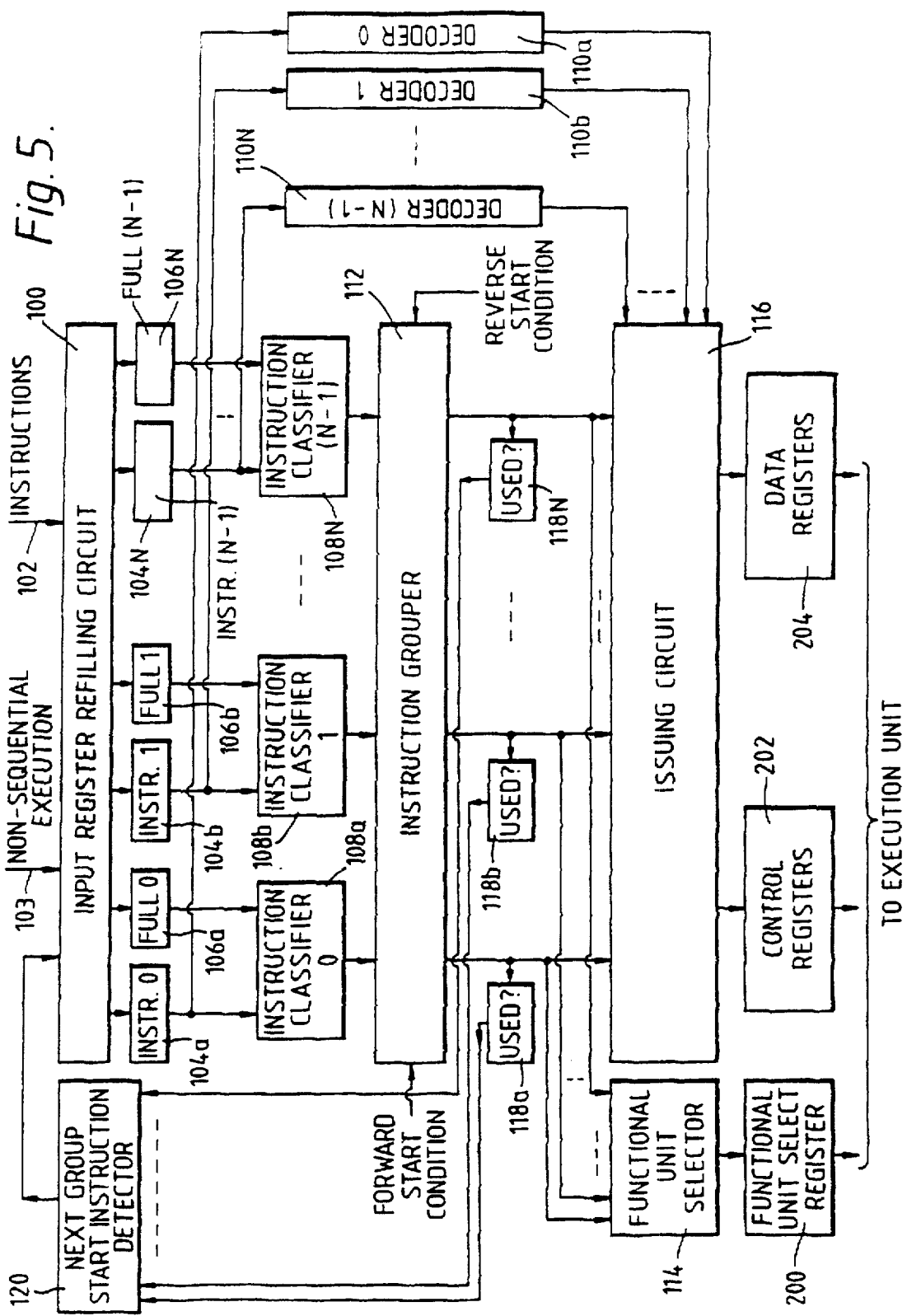

CYCLE 1

CYCLE 2

CYCLE 3

CYCLE 4

CYCLE 5

CYCLE 6

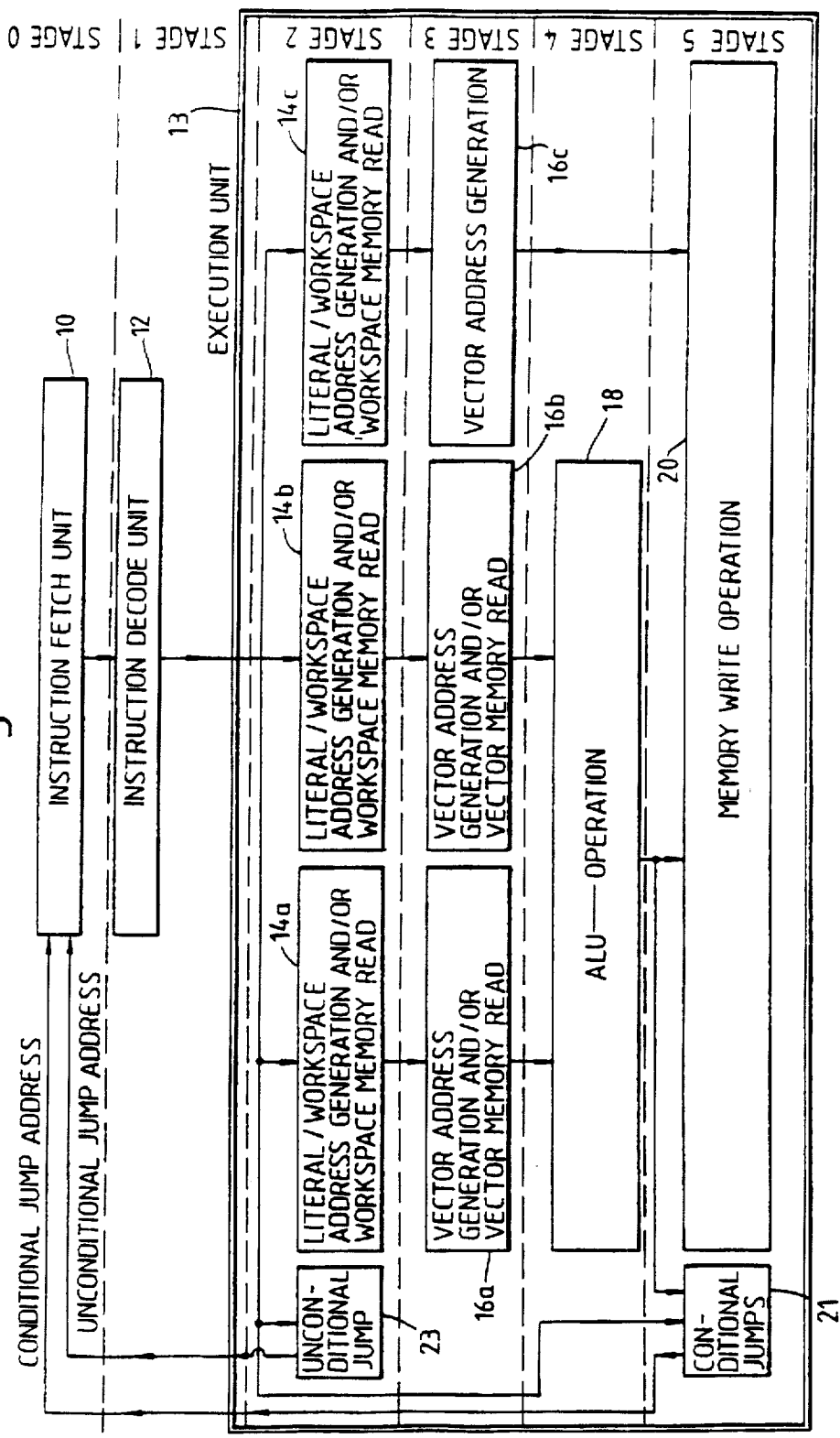

SYSTEM FOR GROUPING INSTRUCTIONS FOR MULTIPLE ISSUE USING PLURAL DECODERS HAVING FORWARD AND BACKWARD PROPAGATION OF DECODING INFORMATION

This is a continuation of application Ser. No. 07/809,966 filed on Dec. 18, 1991 now abandoned.

The present invention relates to apparatus and methods for issuing simultaneously a plurality of compatible instructions in a computer system.

BACKGROUND OF THE INVENTION

In a computer system programs comprise a sequence of instructions which are normally held in a store and in operation a sequence of instructions are fetched from store, decoded and fed to an execution unit. Some machines issue a single instruction after each decode cycle and require execution of that instruction prior to issue of a new instruction by the decoder. Increasing demand for processing power has led to replacement of some Complex Instruction Set computers by Reduced Instruction Set computers. The simplicity of instructions in Reduced Instruction set computers offer simpler hardware and normally require one cycle per instruction with higher operating frequency. Super-scalar machines are also known which issue multiple independent instructions per cycle. In such machines a plurality of independent instructions are issued simultaneously by a decoder to an execution unit. Care is however necessary to avoid simultaneous issue of instructions which are not compatible as may arise where two instructions are dependent such that one requires data which is generated after execution of another, or where both have a conflicting demand on the same functional unit in the execution unit.

It is an object of the present invention to provide an improved computer system and method of operating a computer system in which a group of compatible instructions are issued simultaneously from a decoding unit to an execution unit and selective interconnections are provided in the execution unit to permit execution of dependent instructions which are issued simultaneously.

It is a further object of the invention to test a sequence of instructions and select from the sequence a group to be issued simultaneously from a decoding unit to an execution unit, the selection being such that the instructions in the group do not have conflicting demands on any functional unit in the execution unit.

The present invention is particularly concerned with the grouping together for simultaneous issue of a plurality of separate instructions which retain their separate identity even when grouped together.

SUMMARY OF THE INVENTION

The invention provides a computer apparatus and a method of operating the computer apparatus in which a plurality of instructions are issued simultaneously to an execution unit in the system. Instructions set out in the computer program are stored in memory and a pipeline sequence is carried out consisting of fetching instructions from the memory, decoding the instructions, and executing the instructions. The instructions are dynamically scheduled as the program is run so as to determine which instructions may be issued simultaneously to the executed unit. After fetching the instructions from the memory, separate instructions are identified and classified dependent on which functional unit in the instruction execution unit will be required to carry out the instruction. Groups of instructions are selected for simultaneous issue to the execution unit where the instructions will not make conflicting demands on any functional unit in the execution unit. The instructions are decoded while retaining the separate identity of each instruction, and then issued simultaneously as a group to the execution unit. The computer apparatus comprises pipelined circuitry consisting of an instruction fetch circuitry followed by instruction decoding circuitry and instruction execution circuitry. The decoding circuitry includes classifying circuitry for classifying each instruction dependent on the functional unit required for execution of that instruction, and instruction issuing circuitry connected to the classifying circuitry for issuing simultaneously a group of separate compatible instructions to the execution unit.

BRIEF DESCRIPTION OF THE DRAWINGS

FIG. 4A to 4F illustrate examples of the application of the rules denoted in the diagram of FIGS. 2 and 3;

FIG. 5 is a block diagram of an instruction decode unit for grouping and decoding instructions for supply to a pipeline;

FIG. 12 is a block diagram of an improved version of a pipeline.

DESCRIPTION OF THE PREFERRED EMBODIMENTS

Figure 1:
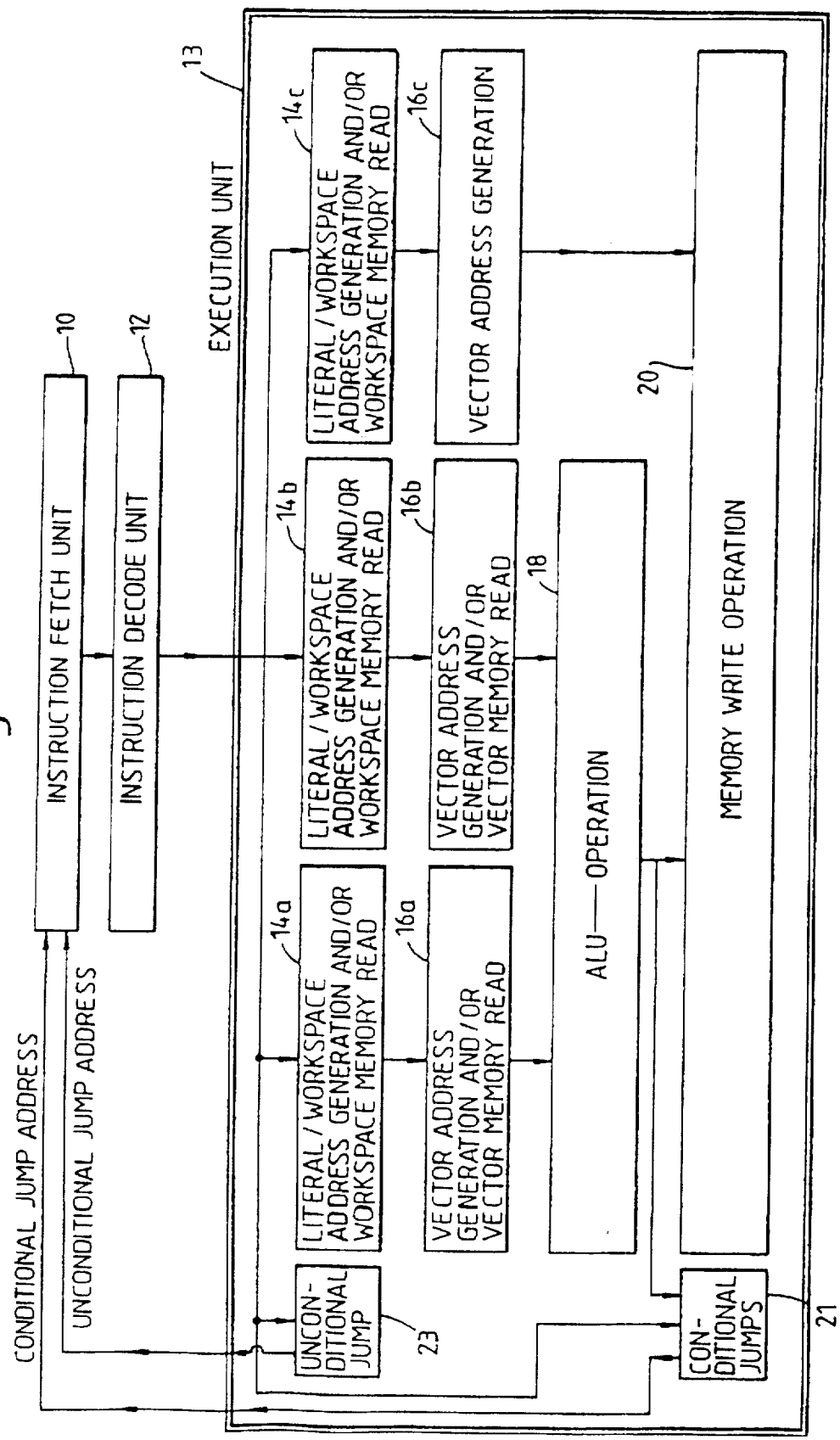
FIG. 1 is a block diagram of an instruction handling system for implementing a method according to the invention.

FIG. 1 illustrates in block diagram form an instruction handling system capable of implementing a method in accordance with the invention. The system comprises an instruction fetch unit 10, an instruction decode unit 12 and an instruction execution unit 13.

This system is intended to be used in a microprocessor having a processor and memory for storing data and a program to be executed by the processor. The program takes the form of a sequence of instructions selected from an instruction set discussed later.

The instruction fetch unit 10 fetches a sequence of instructions in accordance with the program to be executed and passes a plurality of instructions sequentially to the instruction decode unit 12 in each decode cycle. In the following description, it is assumed that N instructions are passed to the instruction decode unit per decode cycle. The instruction decode unit not only decodes the instructions but also groups them to form an executable group which is a group of compatible instructions which can be issued to an execution unit simultaneously for execution. The compatible group may contain all or only some of the N instructions fetched by the decode unit per decode cycle as will become clearer hereinafter.

The execution unit includes a plurality of functional units each arranged to carry out a function in one execution cycle, the function being determined by the instruction. To complete execution of a group of instructions issued simultaneously a plurality of execution cycles may be needed. It is an important feature of this invention that instructions which are grouped together retain their separate identity in the sequence of instructions issued to the execution unit and in the executable group.

For the following description, reference is made to the microcomputer architecture described for example in U.S. Pat. No. 4,704,678 which is incorporated herein by cross reference. In this architecture, a microcomputer processor is capable of executing any one of a plurality of processes. For the execution of each process, A and B registers hold data, operands and addresses as appropriate and an index register (a WPTR register) holds the address of a memory location which denotes the base value of workspace memory for the current process. Such an architecture is described in detail in the aforementioned U.S. patent, which also defines a set of instructions which can be decoded and used by such a microcomputer. To assist in the reading of the present description the instructions used in the following description are repeated below with an explanation as to their meaning. It will be appreciated that the invention can be applied not only to other instructions in the instruction set defined in the above-mentioned patent but also to other instruction set architectures. In the following descriptions, n represents an integer which is supplied by some instructions as their operand. The term operand is used herein to denote numerical values which are utilised when an instruction is executed and can either be supplied with the instruction itself or can be derived from earlier execution of another instruction.

| INSTRUCTION SET DEFINITION | | | |
|---|---|---|---|
| Ldl | n | (1) | Load n into A register |
| | | (2) | Former contents of A register transferred to B register |
| Ldw | n | (1) | Form address Wptr + n |
| | | (2) | Write from that memory location to A register |
| | | (3) | Former contents from A register transferred to B register |
| Ldpw | n | (1) | Form value Wptr + n |
| | | (2) | Load value into A register |
| | | (3) | Former contents of A register transferred to B register |
| Ldv | n | (1) | Form address A + n, where A is the content of the A register |
| | | (2) | Write from that memory location to A register |
| Adl | n | (1) | Form A + n, where A is the content of the A register |
| | | (2) | Load result into A register |
| Add | | (1) | Form A + B, where A and B are the contents of the A and B registers respectively |
| | | (2) | Load result into A register |
| Stw | n | (1) | Form address Wptr + n |
| | | (2) | Write contents of the A register to that address |
| | | (3) | Former contents of B register transferred to A register |
| Stv | n | (1) | Form address A + n, where A is the content of the A register |
| | | (2) | Write contents of the B register to that address |
| J | n | (1) | Form value IPTR + n |
| | | (2) | Load value into IPTR register |
| Jnz | n | (1) | Form value IPTR + n |
| | | (2) | If A it not zero, load value into IPTR register |

As described in U.S. Pat. No. 4,704,678, the IPTR register holds an index pointer to the next line of program to be executed.

Referring again to FIG. 1, the execution unit 13 comprises a plurality of functional units which render the execution unit capable of producing a first source operand and a second source operand, performing an arithmetical or logical operation on those operands (abbreviated herein to ALUOp and including instructions such as Add, defined above) and writing a result to memory.

The functional units can be classified according to their capabilities as follows:

FUNCTIONAL UNIT CLASSIFICATION

Classification (i) Generates addresses in workspace memory (WPTR+n) and/or reads from workspace memory and executes literal instructions Classification (ii) Generates addresses in vector memory (A+n) and/or reads from vector memory Classification (iii) Performs arithmetical operations on data when available at its A and B inputs Classification (iv) Writes contents of register into memory, either vector or workspace according to a previously generated address.

Classification (v) Executes JUMP instructions

The term vector memory is defined in the above referenced U.S. Pat. No. 4,704,678 and as explained therein refers to memory which is addressed using information held in the A register to define a base location to distinguish it from workspace memory which is addressed by an offset value from a previously stored base location held in a WPTR register.

The execution unit of the described embodiment has three classification (i) functional units 14a,14b,14c each capable of generating address in workspace memory and/or reading from workspace memory or executing literal instructions. The execution unit also comprises three classification (ii) functional units 16a,16b,16c, two of which are capable of generating addresses in vector memory (A+n) and/or reading from vector memory while one, 16c, is capable only of generating addresses in vector memory and not of reading from vector memory. There is a classification (iii) functional unit 18 for executing arithmetical or logical (ALU) operations, abbreviated herein to ARITHMETIC OPERATIONS and a classification (iv) functional unit 20 for implementing memory write operations. Finally there are two classification (v) functional units 21,23 for executing conditional and non-conditional JUMP instructions respectively.

The classification (i) functional units 14a,14b,14c are connected to supply data respectively to the classification (ii) functional units 16a,16b,16c. The classification (ii) functional units 16a,16b, are connected to supply their data to the classification (iii) functional unit 18 which is itself connected to supply data to the classification (iv) functional unit 20. This unit 20 is also connected to receive data from the classification (ii) functional unit 16c. The classification (v) unit 23 for executing unconditional jumps is connected to supply its data to the instruction fetch unit 10 in the form of an unconditional jump address which identifies the next line of program to be executed and hence the instruction to begin the next sequence to send to the instruction decode unit 12. The classification (v) unit 21 for executing conditional jumps is similarly connected to supply its data to the instruction fetch unit 10. The unit 21 is also connected to receive data from the functional unit 18 so that a jump instruction is executed if the A register takes on a value other than zero after execution of an ALU instruction by functional unit 18.

To execute any instruction, one or more functional units of the execution unit may be required. For example the instruction Ldw n can be fully executed in a classification (i) functional unit which is capable not only of the memory address generation part, WPTR+n, but also of a memory read operation. However, an instruction such as Stw n requires generation of an address of a location in the workspace memory which can be accomplished in a classification (i) functional unit and a memory write operation which can be accomplished in a classification (iv) function unit. This system has access to a plurality of memory read ports, but there is only one write port. It is also arranged that access to memory for read operations by classification (i) and classification (ii) functional units and access to memory for a write operation by a classification (iv) functional unit can be accomplished without clashes between memory ports.

The functional units are selectively interconnectable so that for any executable group of compatible instructions issued to the execution unit 13, those functional units required for execution of the instructions are enabled and interconnected so that data produced by the execution of one instruction can be utilised for execution of another instruction within the group.

It will be understood from the above that within each decode cycle of the instruction handling system there are required several execution clock cycles so that, within a single decode cycle the execution unit can allow the execution of an instruction requiring data to be produced by another instruction in the same group.

The rules governing the issuance of compatible instructions simultaneously to the execution unit as an executable group will now be described with reference to FIGS. 2 and 3. It will be appreciated that these rules relate to the execution unit 13 as described above with reference to FIG. 1. For an execution unit having a different arrangement of functional units, different grouping rules would apply.

Figure 2:
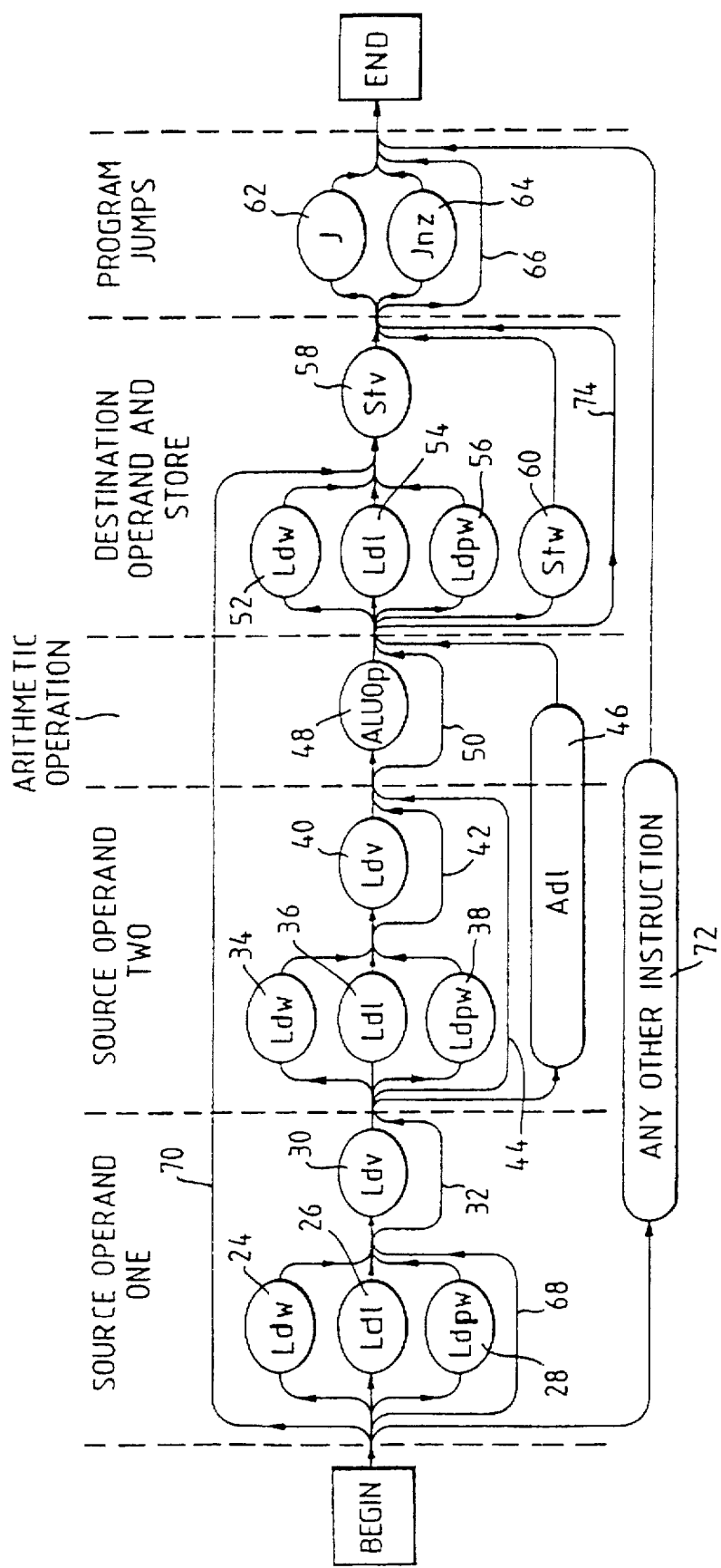
FIGS. 2 and 3 are diagrams illustrating a set of rules by which instructions are grouped for transmission to an instruction execution unit.

In FIG. 2, bubbles with instruction names in them represent instructions and interconnecting lines with arrows represent what instruction may follow after each bubble.

The generation of each source operand can be carried out in two parts, the first part producing a literal value, the contents of a workspace memory address or a memory address denoted by an offset from the address stored in the WPTR register. Instructions which can fill this part are Ldl n, Adl n, Ldpw n, Ldw n. The second part involves reading from vector memory which can be implemented by instruction Ldv n. Of course, if the required source operand is in workspace memory or the result of execution of a literal instruction the second part is not required. This analysis is represented in the two left most sections in FIG. 2, designated SOURCE OPERAND ONE and SOURCE OPERAND TWO. An arithmetic operation is then carried out which can be accomplished by Adl or ALUOp instructions as indicated by the ARITHMETIC OPERATION section. Finally, a memory address for storing the result is generated and the result is written to memory which can be achieved by instructions Ldl n, Ldpw n or Ldw n in combination with Stv n or by instruction Stw n on its own as shown in the DESTINATION OPERAND AND STORE section.

Bubbles 24(Ldw), 26(Ldl), 28(Ldpw) represent the instructions permitted to generate the first operand in the first instance. Bubble 30(Ldv) represents the read operation from vector memory. Arrow 32 indicates that bubble 30 may be bypassed in certain circumstances, for example where the required operand is in workspace memory or generated by execution of a literal instruction. Furthermore, arrow 68 indicates that the decoder may proceed directly to bubble 30. In the next adjacent section SOURCE OPERAND TWO, bubbles 34, 36, 38, 40 correspond respectively to bubbles 24, 26, 28 and 30 and arrow 42 corresponds to arrow 32. Arrow 44 indicates the case where no second operand is to be generated. There is no arrow corresponding to arrow 68 to span bubbles 34,36,38 because this section refers to production of the second operand which must always start with a value that does not depend on the existing contents of the A register. Bubble 46 (Adl) represents a further instruction to fill the section SOURCE OPERAND TWO. It is not appropriate in these sections to have a "write to memory" operation since there has as yet been generated nothing to be stored; therefore instruction Stv does not appear in the SOURCE OPERAND ONE AND SOURCE OPERAND TWO sections. The next adjacent section ARITHMETIC OPERATION represents the instruction to be implemented by bubble 48(ALUOp). Where there is no arithmetic instruction in the instruction sequence, this section can be bypassed as indicated by arrow 50. It will be noted that bubble 46(Adl) extends across both the SOURCE OPERAND TWO section and the ARITHMETIC OPERATION section, since the instruction Adl incorporates an arithmetic operation.

In the next section DESTINATION OPERAND AND STORE, bubbles 52(Ldw), 54(Ldl) and 56(Ldpw) represent the generation of data which can be used as the basis to form a memory address. These can only be executed in conjunction with a store to vector instruction Stv represented in bubble 58 or bypassed completely by a store to workspace instruction Stw in bubble 60. Arrow 74 indicates that this section can be bypassed. It can be seen that this section ensures that generation of the destination address is only allowed if it is due to Stw(bubble 60) or is part of a write operation terminating in a valid Stv(bubble 58) instruction. This is because the execution unit 13 of FIG. 1 cannot handle as its third, operand data which is not to be written to memory at an address generated by an instruction within the compatible group issued to the execution unit. Finally, the rightmost section PROGRAM JUMPS in FIG. 2 can be filled by a J instruction, bubble 62, a Jnz instruction, bubble 64, or bypassed as indicated by arrow 66. In FIG. 2, arrow 70 indicates that grouping can proceed directly to bubble 58 and still utilise the system. Bubble 72 denotes any other instruction, i.e. instructions which cannot be grouped with other instructions to form a compatible group.

In the diagram of FIG. 2 each bubble is illustrated as being fillable by an individual instruction. In fact, as will become clear from the description which follows later relating to the circuitry used to implement the method of grouping instructions, instructions are inspected and grouped utilising classification codes which reflect the classifications of functional units required to execute the instructions and hence the bubbles in the diagram of FIG. 2 which can be filled by those instructions. The classification codes are derived from Table IV which shows how the instruction set referred to herein is classified.

Referring to Table IV, instructions Ldl, Ldw and Ldpw require literal or workspace operations and share a common classification code (i). Bubbles 24,26,28 in the SOURCE OPERAND ONE section of FIG. 2, bubbles 34,36,38 in the SOURCE OPERAND TWO section and bubbles 52,54,56 in the DESTINATION OPERAND AND STORE section can be considered as classification code (i) bubbles. The instruction Ldv has a classification code (ii), so that bubbles 30,40 can be considered as classification code (ii) bubbles. The instruction ALUOp has classification (iii) so bubble 48 in the ARITHMETIC OPERATION section can be considered as a classification code (iii) bubble. The instruction Stv has classification code (ii), (iv), as bubble 58 in the DESTINA- TION OPERAND AND STORE section illustrates. The instruction Adl has classification code (i), (iii) so this can be used to bypass a combination of bubbles having classification codes (i), (ii) and (iii) as indicated by bubble 46. The instruction Stw has classification code (i), (iv) so that this can be used to bypass a combination of bubbles having classification codes (i), (ii) and (iv). Instructions J and Jnz have classification code (v) so that bubbles 62,64 can be regarded as classification code (v) bubbles.

Figure 3:
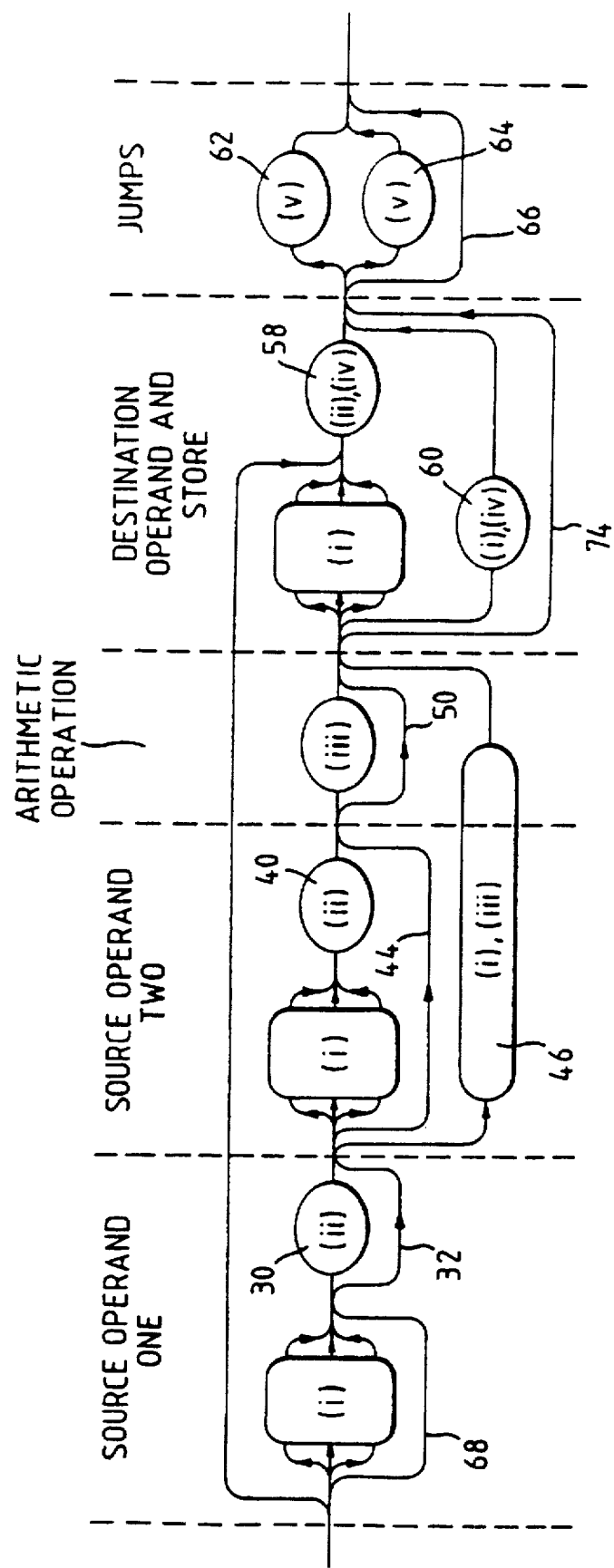

FIG. 3 shows a version of FIG. 2 in which individual instructions are replaced by classifications (i) to (v). It can readily be seen that information concerning the classification code of an instruction and the position allocated to the one preceding it in the instruction sequence determines the bubble for the next instruction.

The use of the rules denoted in the diagram of FIG. 2 will now be described with reference to some examples illustrated in FIGS. 4A to 4F. For each instruction sequence received by the instruction decode unit 12, groups of compatible instructions which can be issued simultaneously to the execution unit 13 in decoded form for execution, may be formed by traversing the diagram of FIG. 2 from left to right. Instructions ere inspected in sequence, classified and given a group code representing the appropriate bubble. When a bubble has been filled, the next instruction has to be placed in a bubble serially forward of the last filled bubble. Having reached the end of the diagram, or a position in the instruction sequence where no more instructions match the remaining bubbles all instructions which have been placed into bubbles comprise a compatible group, provided that there is a route denoted by an arrow or by a completed bubble which can be followed from the beginning to the end of the diagram in FIG. 2. In the following examples, this route is indicated by a heavy black line. To maximise the usage of the full capability of the execution unit, the aim is to fill in as many bubbles as possible for each compatible group.

Filling bubbles may require lookahead information of the instruction sequence. That is, information concerning the succeeding as well as the preceding instruction may be required to place the instruction correctly. For example, if the instruction sequence starts with "Ldw n, Ldv m, ... " they will fill bubbles 24,30 of the SOURCE OPERAND ONE section. However, if the instruction sequence starts with "Ldw n, Stv m, ... " they will fill bubbles 52,58 of the DESTINATION OPERAND AND STORE section. Hence the position of the Ldw n instruction is determined by the succeeding instruction.

Figure 4A:
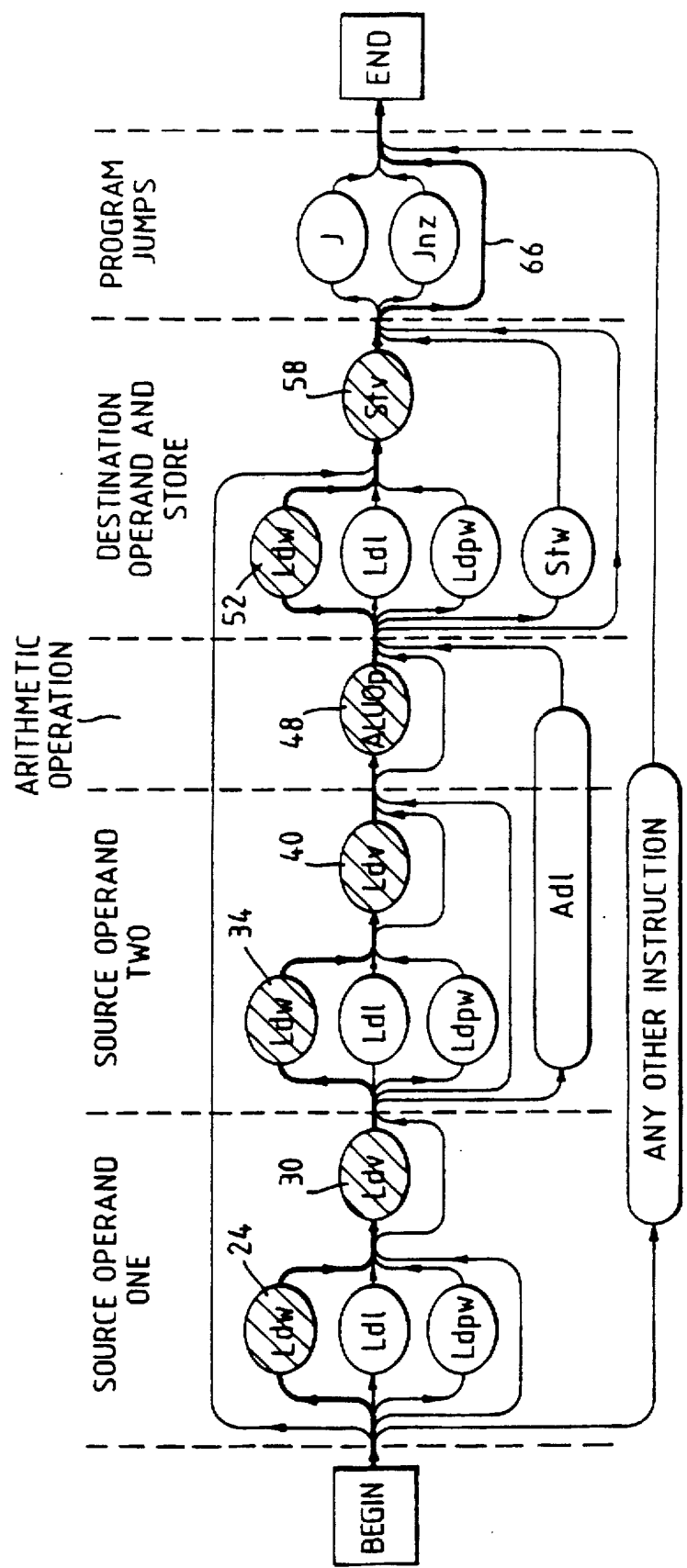

In the example of FIG. 4A, the instruction sequence is Ldw n, Ldv m, Ldw p, Ldv q, Add, Ldw r, Stv s. The first instruction Ldw fills the bubble 24, the second instruction Ldv fills the bubble 30, the third instruction Ldw fills the bubble 34, the next instruction Ldv fills the bubble 40, the Add instruction fills the bubble 48, the Ldw instruction fills the bubble 52 and the Stv instruction fills the bubble 58. The execution unit can execute this sequence of instructions as is indicated by the single non-branched route shown in heavy ink in FIG. 4A and passing through bubble 24, bubble 30, bubble 34, bubble 40, bubble 48, bubble 52 and bubble 58.

In the example of FIG. 4B, the instruction sequence is Add, Ldw n, Stv m. The first instruction which the decoder inspects is the instruction Add and the earliest bubble into which this can be placed is bubble 48. The SOURCE OPERAND ONE and SOURCE OPERAND TWO sections of FIG. 4B are hence bypassed by arrows 68, 32 and 44. The next instruction is Ldw which is placed into bubble 52 and the instruction Stv is placed in bubble 58. The instruction Ldw could not be placed into bubble 24 or 34 since these bubbles had already been bypassed, and it is a requirement of the rules for grouping instructions that an instruction is placed in a bubble serially forward of the last filled bubble.

The examples described below with reference to FIGS. 4C to 4F represent the solution to a specific programming problem. That is, a FOR loop in a high level programming language for adding N integers together and storing the sum can be expressed in OCCAM (a high level programming language set forth in a booklet entitled "Programming Manual—OCCAM" published and distributed by INMOS limited in 1983 in the United Kingdom) by the following two lines of program

```
SEQ i = 0 FOR N
   Sum := Sum + y[i]
``` where N and Sum are integers and y is an array of N integers. Sum and N are initialised prior to this loop. These two lines of high level code can be compiled into the following low level instruction sequence, termed instruction sequence 1.

|       | Ldw | sum     | ;get initial value of "sum" |
|-------|-----|---------|-----|
| Loop: | Ldw | y       |     |
|       | Ldv | 0       | ;load array element |
|       | Add |         | ;add an array element to "sum" |
|       | Ldw | y       | ;increment array pointer |
|       | Adl | 1       |     |
|       | Stw | y       |     |
|       | Ldw | y       | ;Have we reached end of the array? |
|       | Adl | (−Maxy) | (where Maxy = ystart + N) |
|       | Jnz | Loop:   | ;if not, jump to Loop: |
|       | Stw | sum     | ;save final result in "sum" |

As explained in more detail below, this sequence of instructions can be assembled into compatible groups as set out below.

First iteration: (3 groups)

| "Ldw | sum, | Ldw | y, | Ldv | 0, | Add" |
|---|---|---|---|---|---|---|
| "Ldw | y, | Adl | 1, | Stw | y" | |
| "Ldw | y, | Adl | (−Maxy), | Jnz | Loop:" | |

All intermediate iterations: (3 groups)

| "Ldw | y, | Ldv | 0, | Add" | |
|---|---|---|---|---|---|
| "Ldw | y, | Adl | 1, | Stw | y" |
| "Ldw | y, | Adl | (−Maxy), | Jnz | Loop:" |

Last iteration, i.e. when the loop terminates: (4 groups)

| "Ldw | y, | Ldv | 0, | Add" | |
|---|---|---|---|---|---|
| "Ldw | y, | Adl | 1, | Stw | y" |
| "Ldw | y, | Adl | (−MaxY), | Jnz | Loop:" |
| "Stw | sum" | | | | |

These can all be executed by the execution unit 13 of FIG. 1.

In the following explanation of the grouping of instruction sequence 1, use is made of FIG. 2 which illustrates individual instruction bubbles. As mentioned above, in the circuitry described herein, instructions are classified and are then grouped but the following serves to illustrate the use of the grouping rules in principle.

Figure 4C:
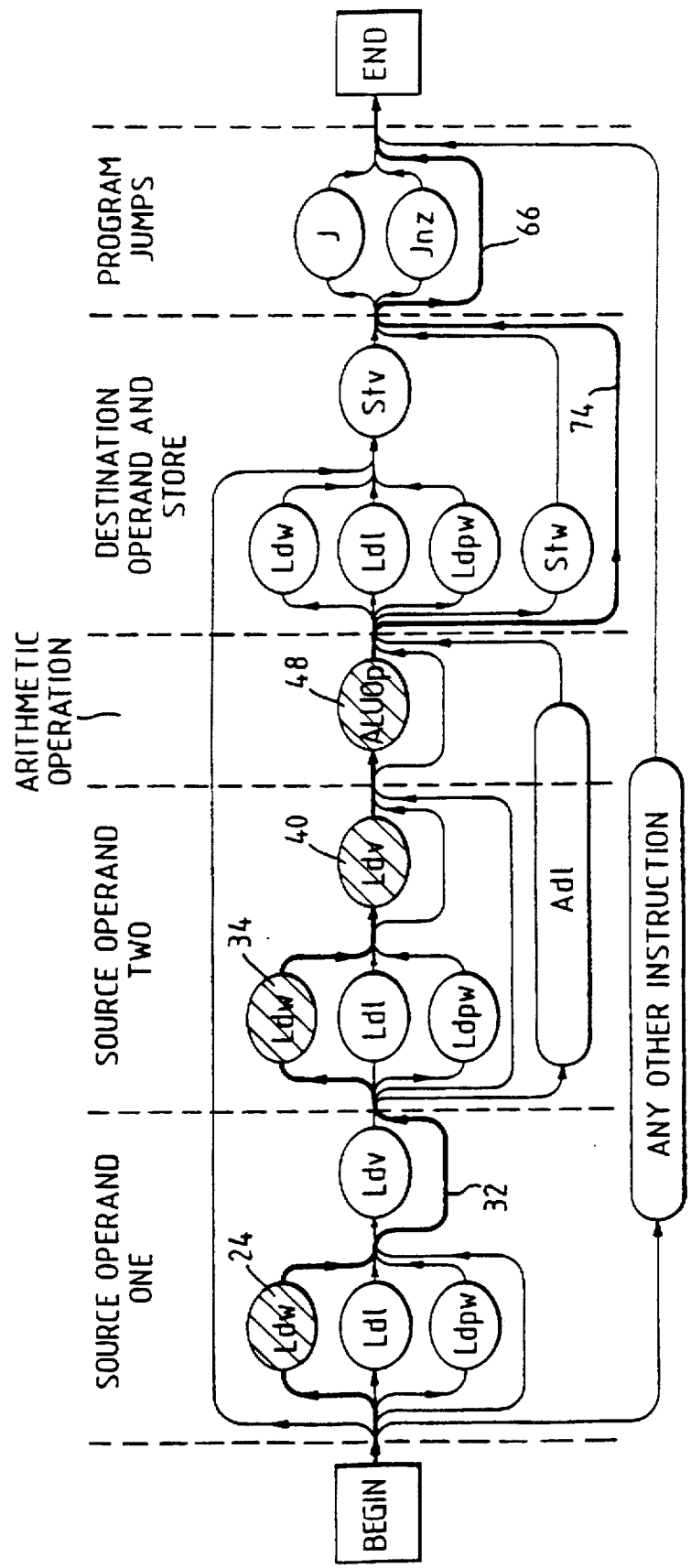

Referring to FIG. 4C, the first instruction to be inspected is Ldw sum and this is therefore placed in bubble 24. The next instruction to be inspected is Ldw y and this is placed in bubble 34, followed by instruction Ldv 0 which is placed in bubble 40. The next instruction Add is placed in bubble 48. The next instruction is Ldw y which cannot be placed in a bubble serially forward of bubble 48. Grouping hence terminates and the instruction sequence Ldw sum, Ldw y, Ldv 0, Add is assembled as a compatible group.

Figure 4D:
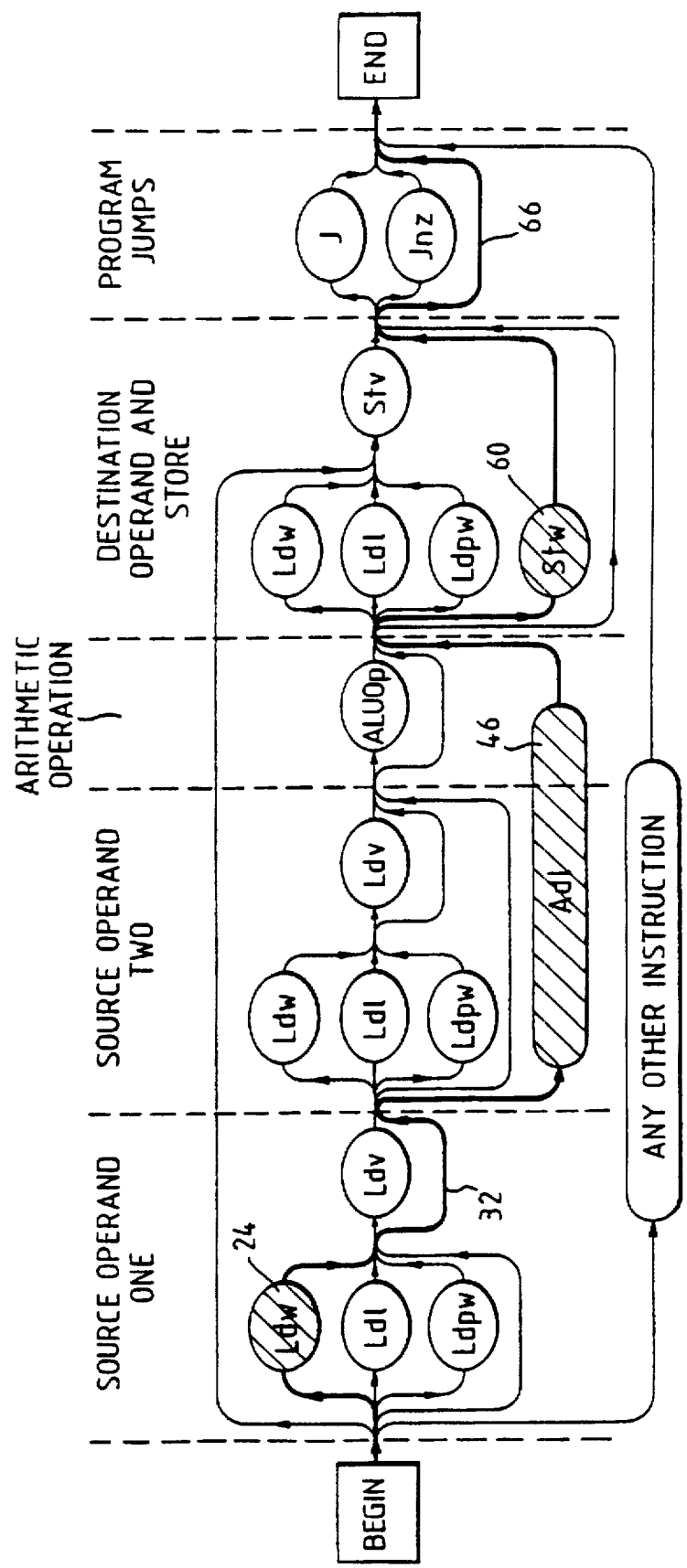

Referring to FIG. 4D, grouping begins from instruction Ldw y which is placed in bubble 24. Instruction Adl 1 is placed in bubble 46 and instruction Stw y is placed in bubble 60. The next instruction Ldw y cannot be placed in a bubble serially forward to bubble 60 so grouping terminates. The compatible group thus determined is Ldw y, Adl 1, Stw y.

Figure 4E:
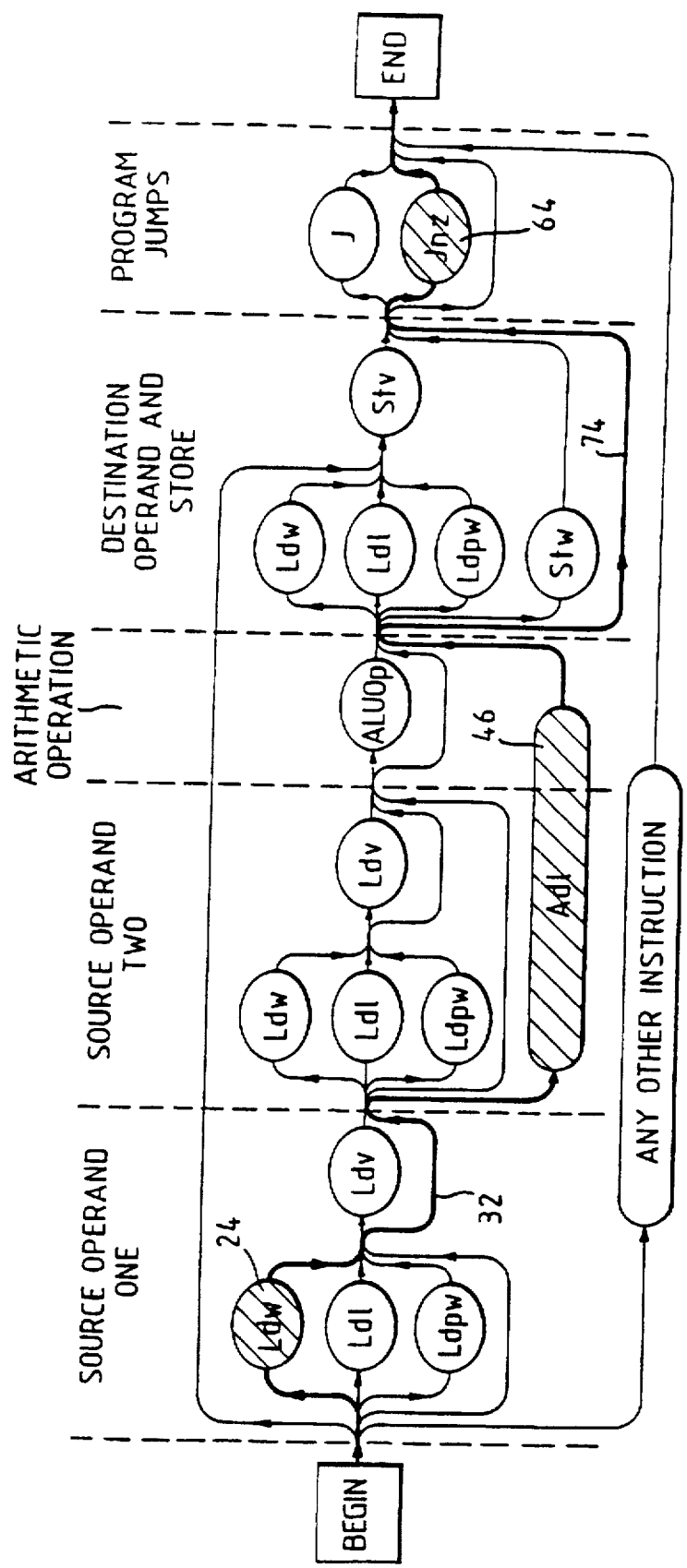

Referring to FIG. 4E, grouping begins from instruction Ldw y which is placed in bubble 24. The following instruction Adl(-maxy) is placed in bubble 46 and the instruction Jnz loop: is placed in bubble 64. The next instruction Stw sum cannot be placed in a bubble serially forward of bubble 64 so grouping terminates. The compatible group thus determined is Ldw y, Adl(-maxy) Jnz loop.

Figure 4F:
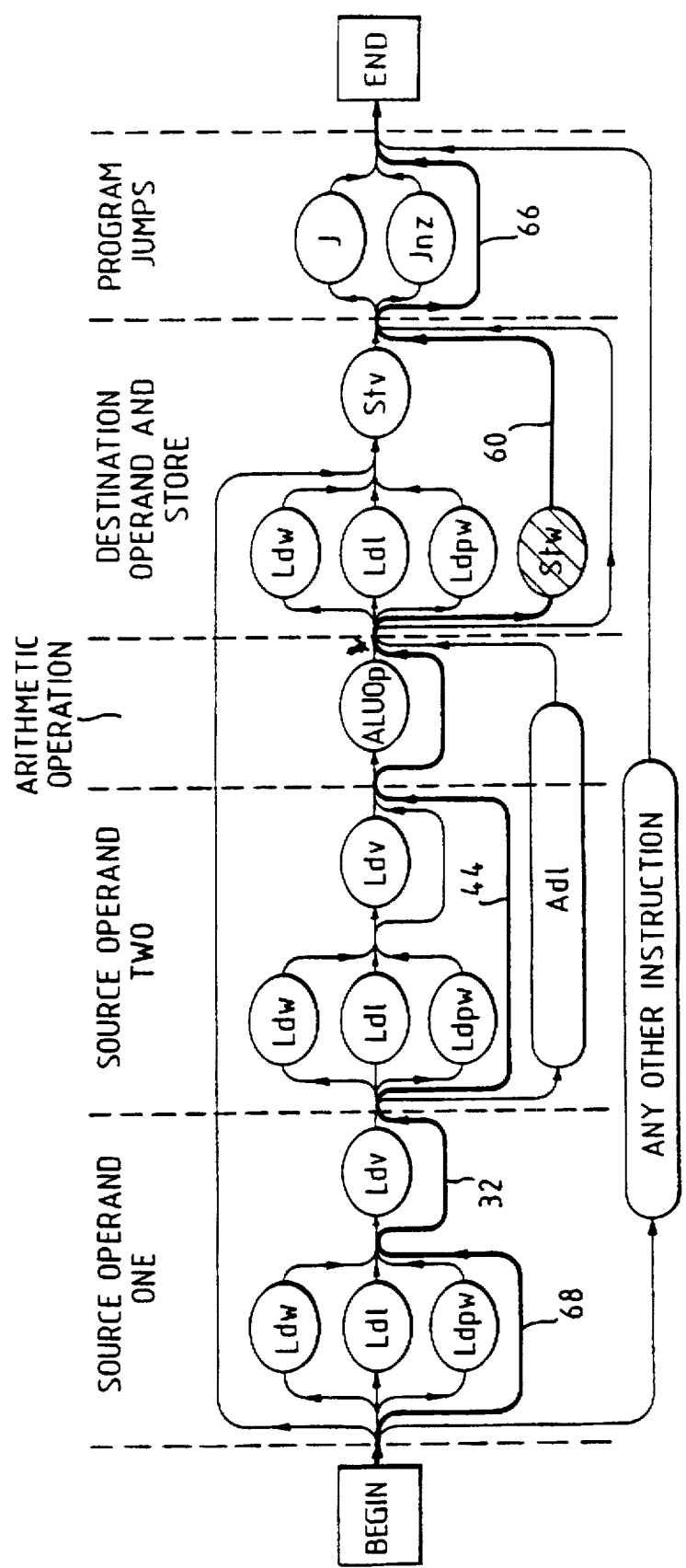

Referring to FIG. 4F, there remains a single instruction Stw sum, which is placed in bubble 60.

Reference will now be made to FIGS. 5 to 8 to describe instruction grouping circuitry which is capable of receiving a sequence of instructions and defining therefrom executable groups of compatible instructions according to the rules discussed above. As shown in FIG. 5, the circuitry comprises an input register refilling circuit 100 to which is fed a sequence of instructions denoted by arrow 102. Arrow 103 denotes a non-sequential execution indicator which is supplied to the decode unit in response to execution of a jump instruction. A plurality of instruction input registers 104a, 104b ... 104N receive respectively one of a group of N instructions at each cycle. Each instruction input register 104a, 104b ... 104N has a full/empty flag 106a, 106b ... 106N associated with it. This flag is set to FULL as each register is filled with a valid instruction from the input register refilling circuit 100. If there are less than N instructions (say K) available to the refilling circuit 100 these are sent to respective registers 104a ... 104K and the full/empty flags of the remaining registers are set to EMPTY.

For brevity, in the following explanation input registers with their FULL/EMPTY flags set to FULL or EMPTY are referred to as FULL or EMPTY input registers respectively.

As shown in FIG. 5, the circuitry further comprises a plurality of instruction classifiers 108a, 108b ... 108N associated respectively with the instruction input registers 104a, 104b ... 104N. There is also a plurality of decoders 110a, 110b ... 110N associated respectively with the instruction input registers 104a, 104b ... 104N. The circuitry described in the following with reference to FIG. 5 operates in a plurality of sequential stages which take place within a single decode cycle as defined above. At the stage following that in which instructions are fed from the input register refilling circuit 100 to the input instruction registers 104a, 104b ... 104N, the instructions are passed from the instruction input registers to the respective instruction classifiers and decoders. Each instruction classifer 108a, 108b .. . 108N classifies the instruction received thereby to produce a classification code which specifies which functional unit(s) of the execution unit that instruction requires for its execution, as described above. An empty input register is classified as an instruction grouping terminator. The instruction classifiers 108a, 108b 108N are connected to supply the classification codes to an instruction grouper 112. The instruction grouper inspects the classification codes and attempts to form the largest group of instructions which may be issued to the execution unit 13 simultaneously. To do this it utilises the rules discussed above and as shown in FIGS. 2 and 3. The instruction grouper inspects the classification codes in turn, i.e. that issuing from instruction classifier 108a first. The first classification code which it receives and which cannot be a valid extension to the group formed by earlier instructions in the group being inspected, or the first instruction input register which is empty, causes grouping to terminate. On the assumption that the first such instruction (or the first such instruction input register) is the ith instruction (or register), the instruction grouper will produce a group of i instructions. It is of course possible that, in a case where all N instruction input registers are full and all N instructions can be executed in one group, i=N. Having found an executable group of instructions, the instruction grouper 112 generates a group code for each instruction which defines the bubble in FIG. 3 to be occupied by that instruction.

A functional unit selector 114 is connected to the instruction grouper 112 to receive therefrom the group codes produced by the instruction grouper. The functional unit selector then determines which of the functional units of the execution unit are required by the group. A functional unit select register 200 holds the results of the functional unit selector 114. At the next sequential stage, this information is sent to the execution unit itself.

The group codes produced by the instruction grouper include a neutral group code which is applied to instructions which cannot form part of the executable group. A neutral group code will enable no units of the execution unit.

At the end of each decode cycle, it is necessary to determine the last instruction accepted in the group so that in the next cycle inspection may begin from the following instruction. To this end, the circuitry shown in FIG. 5 comprises a plurality of instruction use determining units 118a ... 118N which are connected to the outputs of the instruction grouper 112 and which are arranged to inspect a respective group code. An instruction is considered used if its group code is not the neutral group code. The outputs of the instruction use determining units 118a ... 118N are connected to a next group start instruction detector 120 which determines the instruction from which the next group starts on the following decode cycle. The output of the next group start instruction detector 120 is supplied to the input register refilling circuit 100 to define the position of the next instruction to be executed. The input register refilling circuit 100 can then compose the instruction stream to be sent to the input registers on the next decode cycle beginning either from the next non-sequential instruction or the instruction as determined by the next group start instruction detector.

During the same stage of operation within the decode cycle as that in which instruction classifiers provide classification codes to the instruction grouper and the latter provides group codes, the decoders 110a ... 110N operate in parallel with the instruction classifiers and the instruction grouper to decode the instructions to specify the operations required by each instruction and the relevant operands. An issuing circuit 116 is connected to receive from the instruction grouper 112 the group codes produced thereby and to receive from the decoders 110 the decoded instructions. The issuing circuit 116 utilises the group codes and the decoded instructions to select control and data information from instructions in the executable group. This control and data information is held respectively by a control register 202 and a data register 204 for transmission to the execution unit at the next stage of operation.

Figure 6:
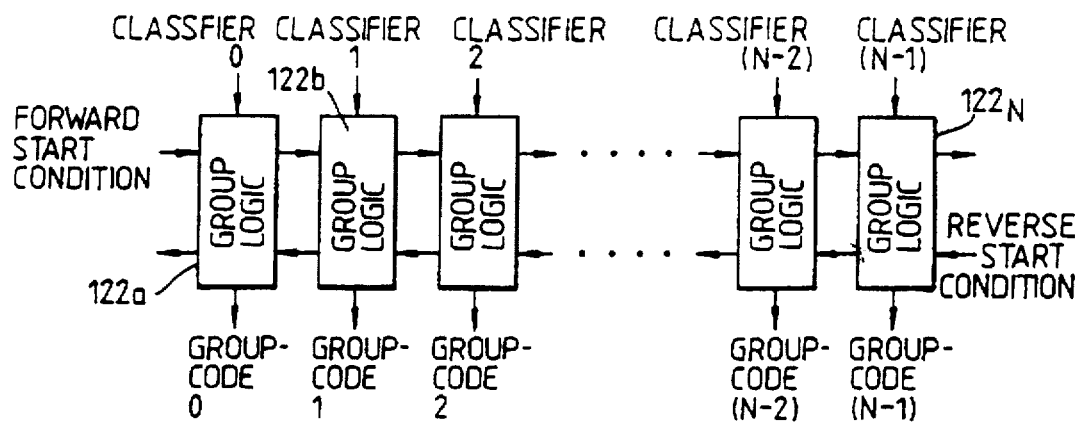
FIG. 6 is a more detailed diagram of grouping circuitry in the decode unit of FIG. 5.

A more detailed explanation of the instruction grouper 112 will now be given with reference to FIG. 6. The instruction grouper 112 comprises N group logic units 122a, 122b ... 122N. The first group logic unit 122a analyses the classification code of the first instruction and, using the rules illustrated in FIG. 3, produces a forward grammar code which indicates a possible appropriate bubble in which to place the instruction. The forward grammer code is transmitted to the next group logic unit 122b which utilises this code together with the classification code of the second instruction to determine whether and. if so how. the second instruction could be a valid extension to the first instruction. The second group logic unit 122b issues a new forward grammar code which is sent to the next group logic unit. This procedure continues with each group logic unit utilising the grammar code from the earlier group logic unit and the classification code of the instruction transmitted to it. For cases where "look ahead information" is required. as discussed above it is possible to carry out a similar procedure from the right hand side of FIG. 6 where each group logic unit supplies to the group logic unit to its left hand side a reverse grammar code.

Figure 7:
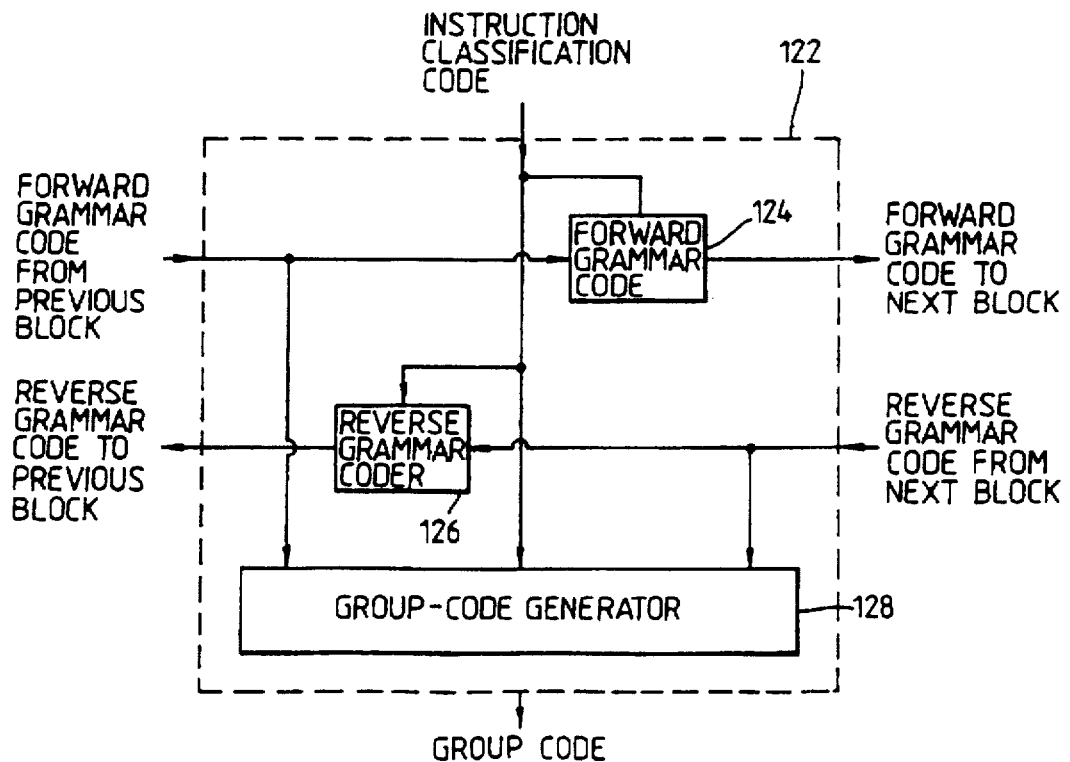
FIG. 7 is a more detailed diagram of a group logic unit as shown in FIG. 6.

The architecture of each group logic unit 122 is shown in more detail in FIG. 7. Each group logic unit 122i comprises a forward grammar coder 124 connected to receive the grammar code from the previous group logic unit 122i−1 and to supply the new forward grammar code to the next group logic unit 122i+1. There is also a reverse grammar coder 126 for receiving the reverse grammar code from the next group logic unit 122i+1 and for supplying the new reverse grammar code to the previous group logic unit 122i−1. Finally the group logic unit 122i includes a group code generator 128 which inspects the forward and reverse grammar codes and the classification code of that instruction and makes a decision as to whether to accept or reject that instruction from the group being assembled and generates a group code accordingly.

It should be noted that transfer of forward and reverse grammar codes run independently of one another. Their behaviour can be considered to be analagous to carry chains so that fast carry chain design methods such as carry look ahead or carry skip may be applied to good effect.

Figure 8A:
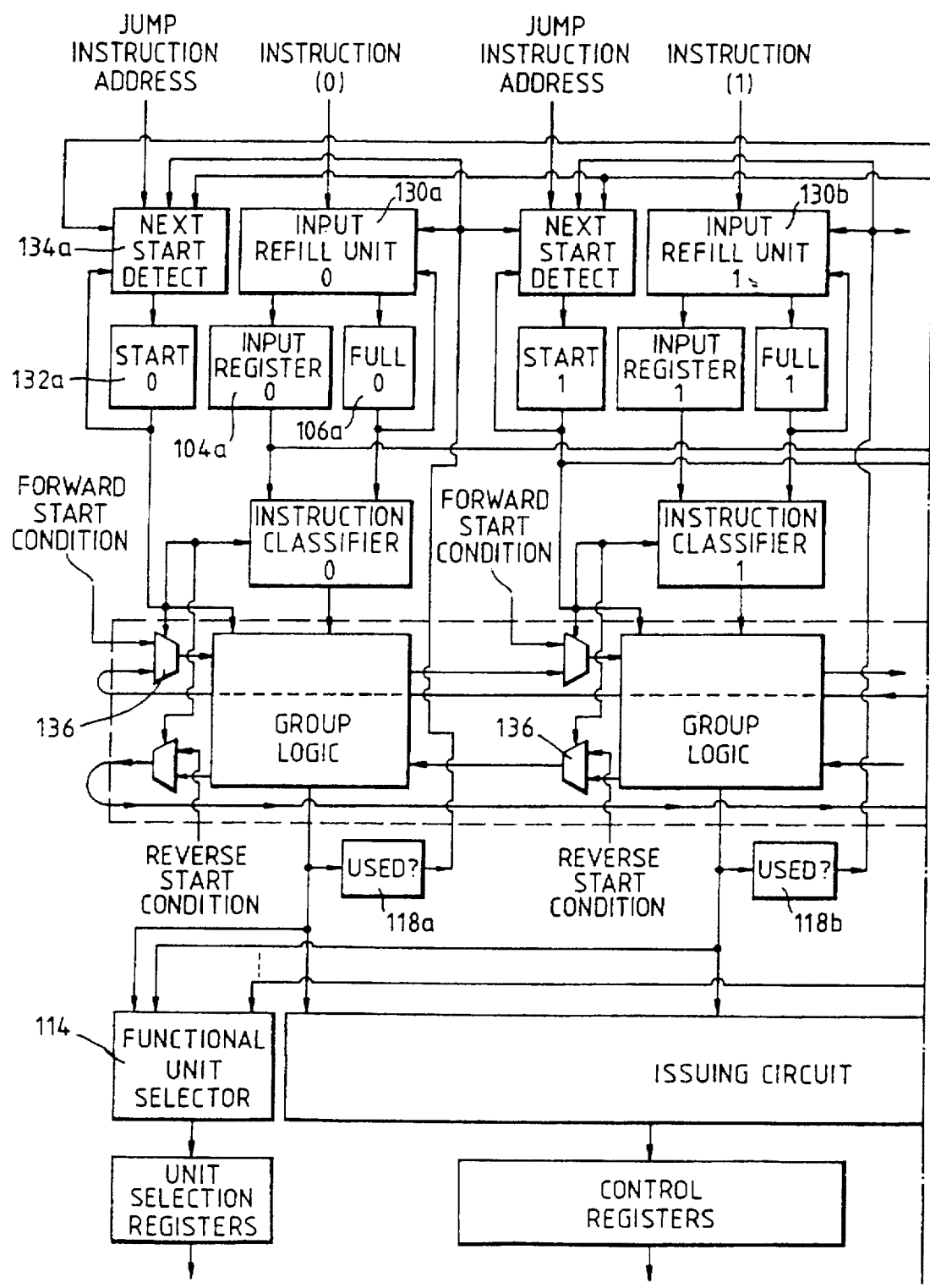
FIG. 8 is a diagram of an improved version of the instruction decode unit shown in FIG. 7.
Figure 8B:
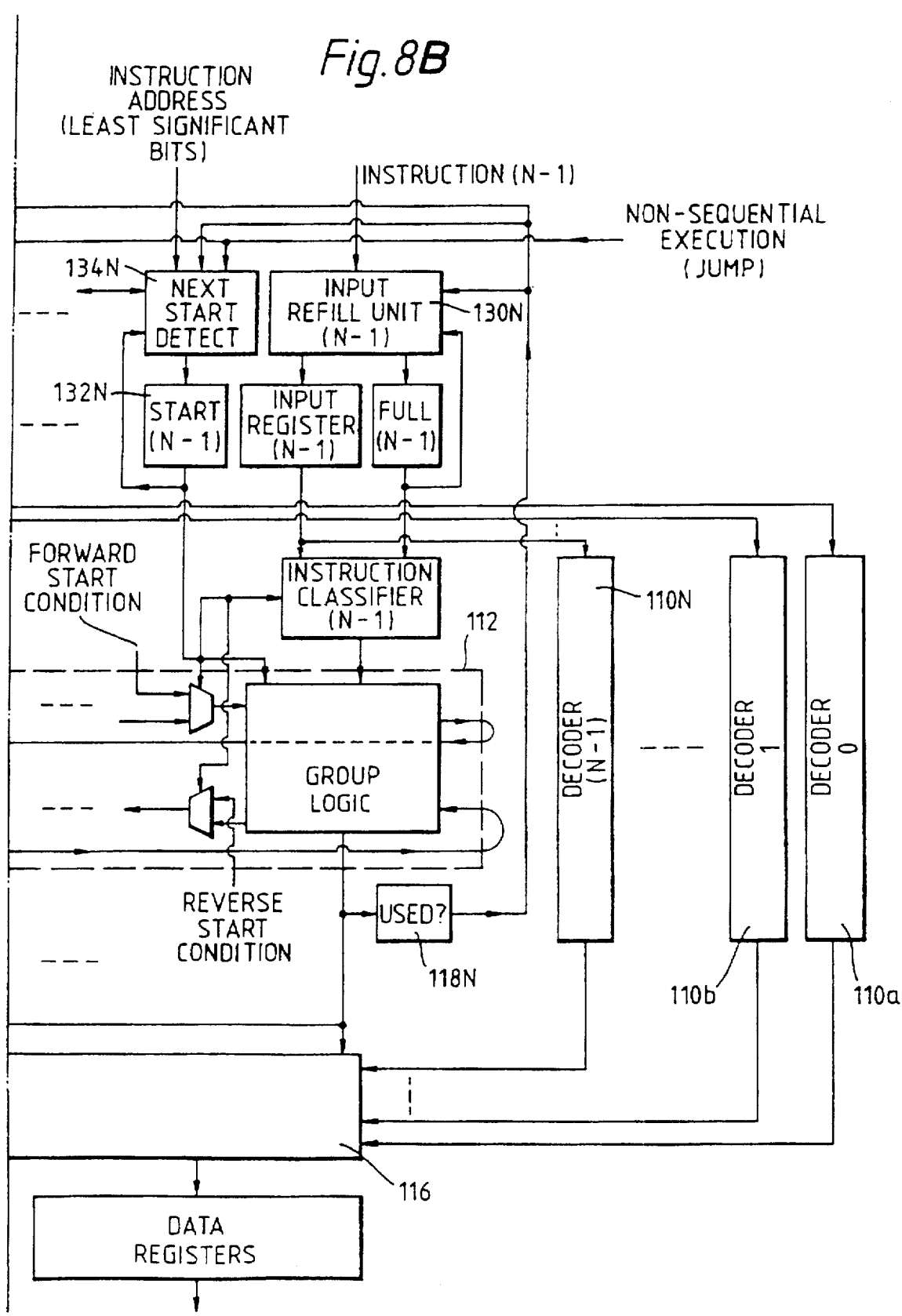

An improved version of the circuitry shown in FIG. 5 is illustrated in FIG. 8. In FIG. 8, like reference numerals are used to indicate like parts in FIG. 5. In the circuitry of FIG. 5. the instruction group 112 acts to form an executable group of compatible instructions starting always from the first instruction register on the left 104a. Hence. these registers must always be refilled by the next set of N instructions. In contrast, in the circuitry of FIG. 8, the input register refilling circuit 100 comprises a plurality of input refill units 130a, 130b . . . 130N. Each instruction is sent in association with a start bit which is supplied to a start bit flag 132a . . . 132N associated with each instruction input register 104a . . . 104N. Only one start bit can be set per cycle. The grouping of instructions by the instruction grouper 112 commences with the instruction contained in the input register 104i whose start flag 132i is set and proceeds through the instruction input registers 104i . . . 104i−1 until N instructions have been inspected. that is until the input register 104i−1 immediately behind the register 104i whose start bit is set is reached. In this way. the input registers 104 behave like a circular buffer.

There is a next start detector unit 134a . . . 134N associated with each input refill unit 130a . . . 130N. The next start detector units 134 produce the start bits for the next decode cycle as a result of inspection of the output of the instruction use determining units 118a . . . 118N and the start bits of the present decode cycle. The beginning of the next group is the first instruction which is not used while its predecessor has been used. If all of the input instructions are used, the next group will start from the same input register as the present group.

Each input register 104i is filled with an instruction from its input refill unit 130i if the input register 104 is empty or if its instruction has been used in the present cycle. If the input register is filled with a valid instruction, its FULL/ EMPTY bit unit 106 is set to FULL. If an input refill unit does not have a valid instruction available and its corresponding input register requires refilling. the FULL/EMPTY flag of that register will be set to EMPTY. This means that full input registers which are not grouped in the present cycle are kept to be used in the next decode cycle. Furthermore. if all input instructions are used in the present cycle. all input registers will be refilled with new instructions for the next cycle.

The instruction grouper 112 behaves similarly to that described above with reference to FIGS. 6 and 7, apart from the fact that the instruction grouping need not necessarily begin from the first group logic unit 122a but may begin at any group logic unit in correspondence with the input register 104i whose start bit 132i is set. To this end, each group logic unit is associated with logic means 136. These logic means can take the form of 2 to 1 multiplexors capable of initialising the transfer of forward and reverse grammar codes to their start conditions at the commencement of each cycle.

The grouping of instructions according to the capabilities of the execution unit to which they are to be issued simultaneously enables instructions to be handled with greater speed than has hitherto been possible. It is possible to gain even greater speed advantages if the instruction handling system is pipelined.

Figure 9:
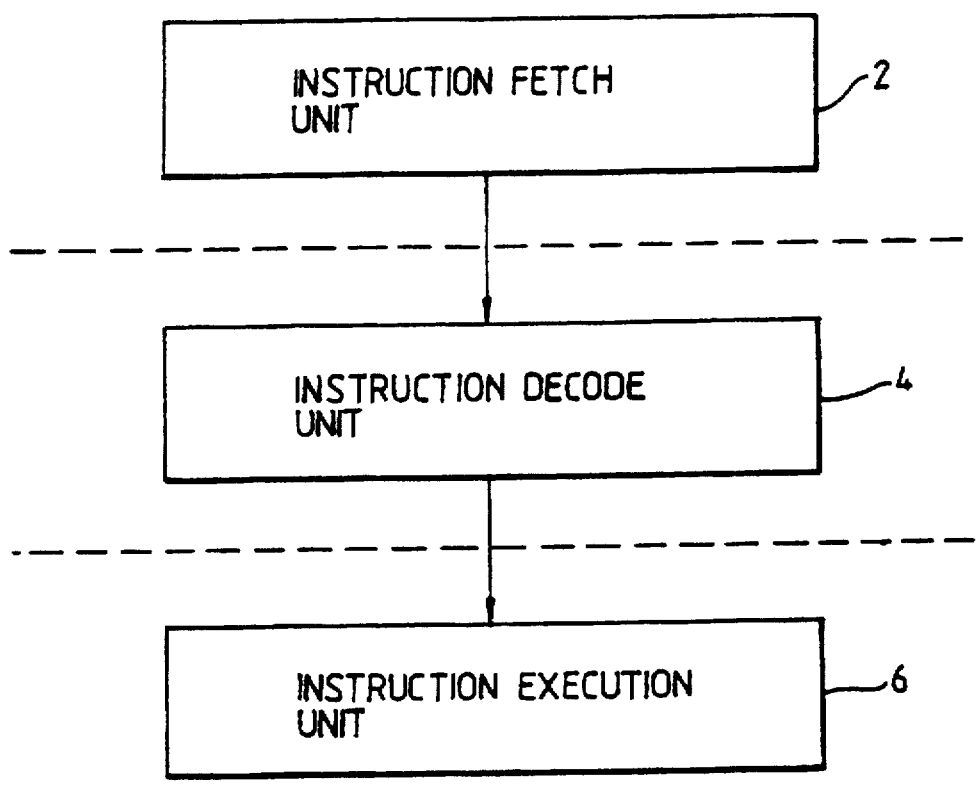
FIG. 9 is a block diagram of a simple pipeline.

The principles of piplining are readily understood by persons skilled in the art but to aid the following discussion reference will first be made to FIG. 9 which illustrates a simple pipeline comprising an instruction fetch unit 2, an instruction decode unit 4 and an instruction execution unit 6. During each cycle of operation, the instruction decode unit 4 receives one instruction from the instruction fetch unit, decodes it and issues it in decoded form to the instruction execution unit 6. In this case, an execution cycle is the time taken for the execution of one instruction by the execution unit. This simple pipeline hence operates so that one instruction per decode cycle is issued to the instruction execution unit. Table I illustrates the cycle by cycle operation for an exemplary sequence of instructions as follows:

"Ldw n, Ldv m, Ldw p, Ldv q, Add, Ldw r, Stv s", where 'm', 'n', 'p', 'q', 'r' and 's' are integers.

At the end of each cycle the instruction fetch unit 2 always has the next instruction available to be passed to the instruction decode unit 4 on the next cycle. As can be seen from Table I. at each cycle one instruction is decoded while the instruction decoded in the previous cycle is executed. In this pipeline, the instruction execution unit is capable of executing only one instruction per cycle. The instruction throughput of a processor is defined as the number of instructions the decoder issues to the execution unit per cycle. It can be seen from Table I that the instruction throughput of the pipeline shown in FIG. 9 is one instruction per cycle.

Figure 10:
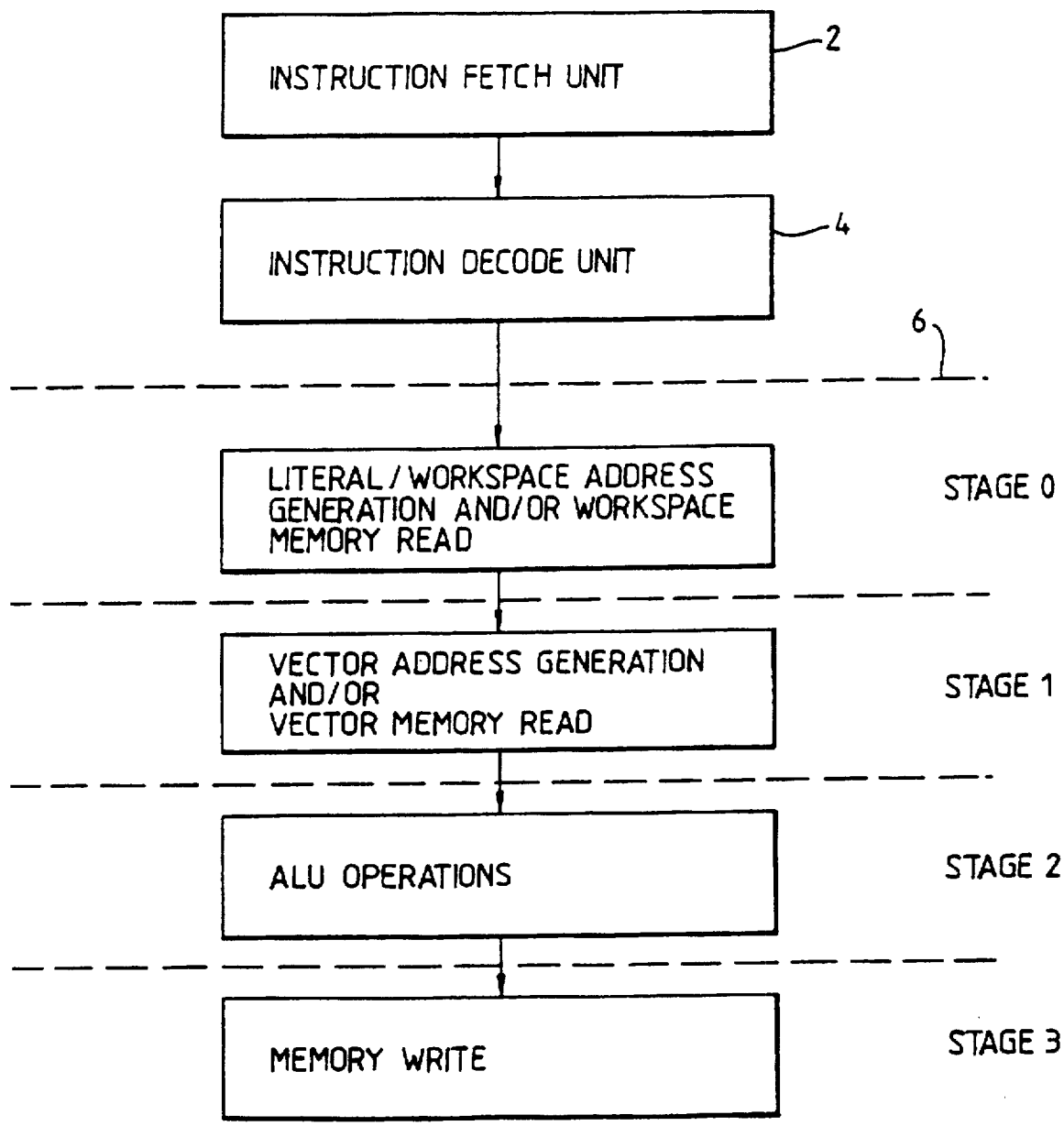
FIG. 10 is a block diagram of a pipeline in which an execution unit comprises a plurality of execution stages.
Figure 11A:
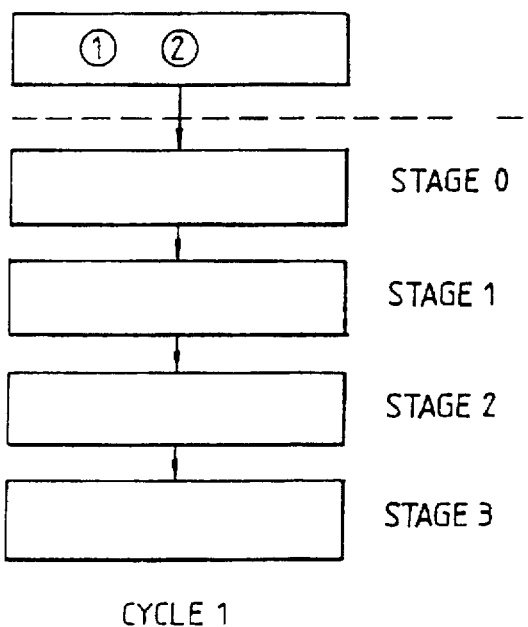
FIG. 11 is a diagram showing the various stages of execution in the pipeline for an exemplary set of instructions.
Figure 11B:
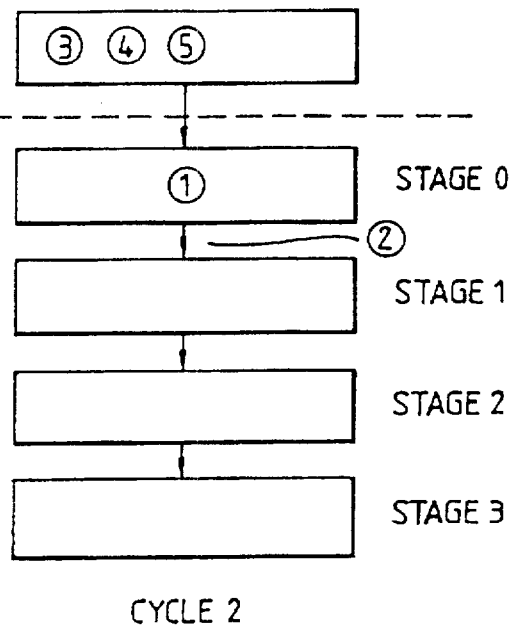
Figure 11C:
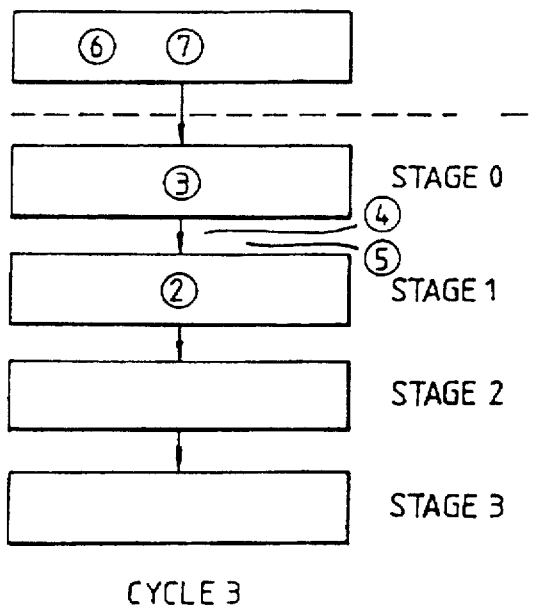
Figure 11D:
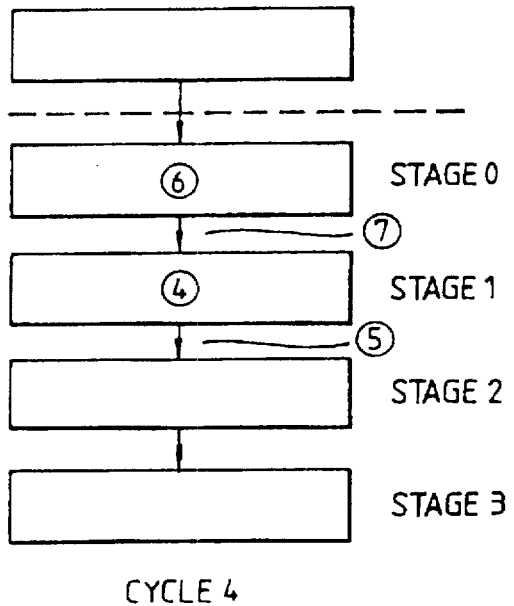
Figure 11E:
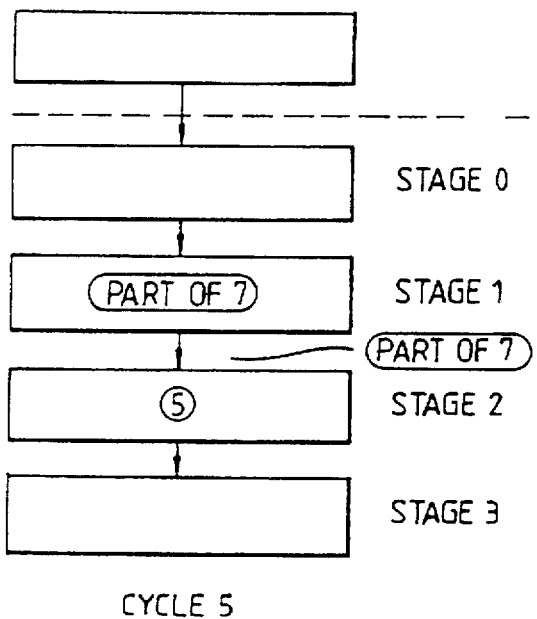
Figure 11F:
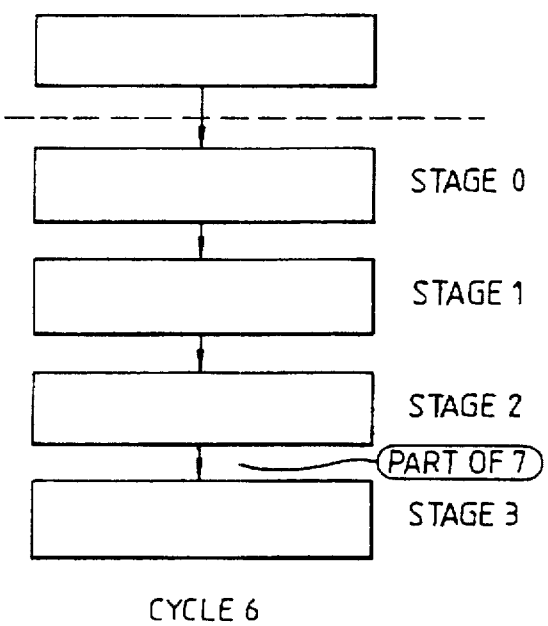

FIG. 10 illustrates a modified version of the pipeline in which the instruction execution unit 6 comprises four stages, stage 0 to stage 3. The stages of the execution unit are designed to cope with different operations required by the instruction set defined above. The capabilities of each stage correspond to the classification of the functional units as given below.

Stage 0 classification (i)
Stage 1 classification (ii)

Stage 2 classification (iii)
Stage 3 classification (iv)

Operation of the pipeline in FIG. 10 will now be described with reference to Table II and FIG. 11. The pipeline operates in accordance with a simple set of rules. Firstly, although the decode unit 4 is capable of decoding any number of instructions, each stage of execution is capable of executing one instruction, or perhaps only part of an instruction according to the classification of the stage, in a single execution cycle.

Secondly, each stage can make a decision within each cycle whether to execute an instruction (or part of an instruction) or to pass it to the next stage. In one execution cycle, an instruction (or unexecuted part thereof) can only advance to the next stage.

FIG. 11 and Table II illustrate the application of these rules to the pipeline of FIG. 10. In FIG. 11, instructions in the box defining each stage denote an instruction being executed while instructions against vertical arrows denote instructions being transferred to the next stage. To ease the following explanation, the instructions have been numbered in the order they appear in the instruction sequence as shown in Table II: these numerals are used in FIG. 11.

In cycle 1 instructions 1 and 2 are decoded and passed to stage 0. No execution can be carried out because no instructions are yet present in any of the execution stages.

In cycle 2, instructions 3, 4 and 5 are decoded while instruction 1 is executed by stage 0 of the pipeline. As stage 0 of the pipeline has made the decision to execute instruction 1 it passes instruction 2 to the next stage of the pipeline, stage 1.

In cycle 3, instructions 6 and 7 are decoded to complete the decoding of the present instruction sequence, while stage 0 of the pipeline makes the decision to execute instruction 3 out of instructions 3, 4 and 5 available to it. Instructions 4 and 5 are hence passed in clock cycle 3 to the second stage of the pipeline stage 1. Meanwhile, stage 1 of the pipeline is executing instruction 2 which it received in cycle 2.

In cycle 4, stage 0 of the pipeline makes the decision to execute instruction 6. Instruction 7 is hence passed to stage 1 of the pipeline. At the same time, stage 1 of the pipeline has made the decision to execute instruction 4 and has passed instruction 5 to stage 2 of the pipeline. In a continuous system, in cycle 4 decoding of a further instruction sequence could begin, but this is not described here.

In cycle 5, stage 0 of the pipeline in the present example has no instruction to execute or decision to make and so does nothing. Stage 1 of the pipeline makes a decision to execute part of instruction 7. It will be noted that instruction 7 is the instruction Stv n and requires both the generation of an address and the writing into memory at that address. Only stage 3 of the pipeline is capable of executing memory write operations. For this reason, stage 1 of the pipeline makes the decision to execute the memory address generation part of instruction 7 and passes the remaining part to stage 2 of the pipeline. Meanwhile, stage 2 of the pipeline is executing instruction 5.

In cycle 6, the only stage of the pipeline which has an instruction to execute is stage 2, which now holds the second part of instruction 7. However, stage 2 does not have the capacity to implement this instruction so the clock cycle is utilised to pass the second part of instruction 7 to stage 3 of the pipeline. In cycle 7, stage 3 of the pipeline executes the final part of instruction 7 to complete the instruction sequence.

It can be seen from Table II that seven instructions are issued to the instruction execution unit over three cycles so that the instruction throughput for the exemplary set of instructions is 7/3=2.33 instructions per cycle.

In this piplined example the fetch unit 2 and decode unit 4 each form a respective stage in the pipeline having the same cycle time as each of the stages 0 to 3 of the execution unit. It can be seen from the above that the advantage to be gained from pipelining is that each stage of the pipeline is, in the optimum case, always operating once each cycle, assuming that sequences of instructions are available continuously. These principles can be used in the present invention by constructing the fetch unit 10, decode unit 12 and the execution unit 13 as a plurality of pipelined stages as illustrated in FIG. 12. With the instruction handling system defined above with reference to FIG. 1, four cycles are taken for an executable group of compatible instructions to be executed by the execution unit. The decode unit issues a group of instructions once every four cycles as a next executable group is only issued after complete execution of all instructions in the preceding executable group. In contrast, with the arrangement of FIG. 12, each stage of the pipeline operates in one cycle, with a new group of instructions being issued to the first stage of the execution unit each cycle. The issuance of instructions from the instruction decode unit is hence speeded up. This can be seen more clearly from the following detailed description of FIG. 12 which shows a six stage pipeline.

In FIG. 12, the execution unit 13 is divided into four pipelined stages. Stage 2 of the pipeline comprises the three classification (i) function units 14a,14b,14c. Stage 3 of the pipeline comprises the three classification (ii) functional units 16a,16b and 16c. Stage 4 of the pipeline in FIG. 12 comprises the classification (iii) functional unit 18 for executing arithmetic or logical (ALU) operations. Stage 5 comprises the classification (iv) functional unit 20 for implementing memory write operations.

Table III illustrates the cycle by cycle operation of the instruction handling system of FIG. 12. For the following explanation, it is assumed that the group of instructions is a group which has been determined as being an executable group of compatible instructions. The explanation which follows uses the group of instructions used to explain the pipeline of FIG. 9.

In cycle 1 the group of seven instructions is issued to the execution unit in decoded form. In cycle 2, all the instructions are passed to stage 2 of the pipeline which makes the decision as to whether it is capable of executing the instructions, and if so in which of its execution units 14a, 14b, 14c, or whether the instructions should be passed to the next stage. It makes the decision to execute instructions 1, 3 and 6 and to pass instructions 2, 4, 5 and 7 to stage 3. The execution of instructions 1, 3 and 6 produces three addresses, two for read which are passed to instruction execution units 16a, 16b of stage 3 and one for write which is passed to instruction execution unit 16c of stage 3. In cycle 3, stage 3 makes the decision to execute instructions 2 and 4 in the instruction execution units 16a, 16b to produce two operands and to execute the address generation part of instruction 7 in instruction execution unit 16c. The operands are passed to stage 4 as is instruction 5 while the remaining part of instruction 7 (the memory write operation) is clocked from the instruction execution unit 16c through stage 4 of the pipeline to stage 5. In cycle 4 stage 4 executes instruction 5 to generate write data passes the remaining part of instruction 7 to stage 5 and in cycle 5, stage 5 of the pipeline executes the remaining part of instruction 7 using the write address from stage 3 and the data from stage 4 to complete the instruction set.

It will be apparent that the full capability of the pipeline shown in FIG. 12 can only be exploited if instructions to be issued by the decode unit are grouped into a compatible group which preferably maximises the use of each stage of the pipeline. It will be clear that any group of instructions issued simultaneously may use some or all of the pipeline facilities. As the instruction group passes through the pipeline each stage executes its instructions, produces results accordingly and then the non-executed instructions and the results of the instructions which have been executed are passed onto the next stage. If a pipeline stage is not required by an instruction, that instruction is passed onto the next stage at the next cycle with no operations having been executed and no new results having been generated.

It will be seen that in the above examples, the group of instructions which is selected for simultaneous issue are compatible in that their demands on the functional unit of the execution unit are distributed so that there is no conflicting demand for simultaneous use of any one functional unit.

TABLE I

| | Decode | Execute |
|---|---|---|
| Cycle 1: | Ldw n | |
| Cycle 2: | Ldv w | Ldw n |
| Cycle 3: | Ldw p | Ldw m |
| Cycle 4: | Ldv q | Ldw p |
| Cycle 5: | Add | Ldv q |
| Cycle 6: | Ldw r | Add |
| Cycle 7: | Stv s | Ldw r |
| Cycle 8: | | Stv s |

TABLE II

| | | Execute | | | |
|---|---|---|---|---|---|
| Decode | | Workspace Stage (Stage0) | Vector Stage (Stage1) | Function Stage (Stage2) | Write Stage (Stage3) |
| Cycle 1: | (1) Ldw n (2) Ldv m | | | | |
| Cycle 2: | (3) Ldw p (4) Ldv q (5) Add | Ldw n | | | |
| Cycle 3: | (6) Ldw r (7) Stv s | Ldw p | Ldv m | | |
| Cycle 4: | | Ldw r | Ldv q | | |
| Cycle 5: | | | Address Part of "Stv s" | Add | |
| Cycle 6: | | | | | |
| Cycle 7: | | | | | "Stv s" Memory Write |

TABLE III

| | Execute | | | |
|---|---|---|---|---|
| Decode | Workspace Stage (Stage2) | Vector Stage (Stage3) | Function Stage (Stage4) | Write Stage (Stage5) |
| Cycle 1: | | | | |
| (1) Ldw n | | | | |
| (2) Ldv m | | | | |
| (3) Ldw p | | | | |
| (4) Ldv q | | | | |
| (5) Add | | | | |
| (6) Ldw r | | | | |
| (7) Stv s | | | | |
| Cycle 2: | Ldw n Ldw p Ldw r | | | |
| Cycle 3: | | Ldv m Ldv q Address Part of "Stv s" | | |
| Cycle 4: | | | Add | |

TABLE III-continued

| | Execute | | | |
|---|---|---|---|---|
| Decode | Workspace Stage (Stage2) | Vector Stage (Stage3) | Function Stage (Stage4) | Write Stage (Stage5) |
| Cycle 5: | | | | "Stv s" Memory Write |

TABLE IV

| | Classifications | | | | |
|---|---|---|---|---|---|
| | Literal or Workspace Operation (i) | Vector Operation (ii) | Function (iii) | Store (iv) | Program Jump (v) | Any Other Instruction |
| Ldl n | Yes | — | — | — | — |
| Ldw n | Yes | — | — | — | — |
| Ldpw n | Yes | — | — | — | — |
| Ldv n | — | Yes | — | — | — |
| Adl n | Yes | — | Yes | — | — |
| AluOp | — | — | Yes | — | — |
| Stw n | Yes | — | — | Yes | — |
| Stv n | — | Yes | — | Yes | — |
| J n | — | — | — | — | Yes |
| Jnz n | — | — | — | — | Yes |
| (Other Instructions) | — | — | — | — | — | Yes |

We claim:

1. A method of executing a plurality of instructions in a computer system having a program formed by a plurality of said instructions, in which each instruction is executed in an execution unit having a plurality of functional units, said method comprising:

effecting a pipelined sequence of (I) fetching and issuing instructions from memory, (II) decoding said instructions and (III) executing said instructions to run the program, said method including dynamically scheduling the instructions for execution, as said program is run, by identifying a succession of separate instructions, classifying each instruction in said succession dependent on said functional units required for the execution of that instruction, said classifying being carried out in the pipelined sequence after the instructions have been fetched and issued, selecting a group of instructions from a plurality of instructions in said succession which according to their classification are compatible for simultaneous issue to the execution unit without conflicting demands on any functional unit in the execution unit, decoding said group of instructions while retaining the separate identity of each instruction, and passing said group simultaneously to the execution unit.

2. A method of executing a plurality of instructions in a computer system having a program formed by a succession of said instructions, said method comprising:

fetching a plurality of instructions from a program store, issuing the plurality of instructions to a decode unit to decode the instructions, and executing each of said plurality of instructions in an execution unit having a plurality of pipelined stages each comprising at least one functional unit, wherein after fetching said plurality of instructions and issuing to the decode unit, said instructions are scheduled as the program is run to determine compatibility so that a plurality of separate compatible instructions are issued simultaneously as a group to the execution unit, the group including at least one instruction which is dependent on another instruction in the group by requiring data to be provided by execution of said another instruction, executing said group of instructions in the execution unit and selectively interconnecting said functional units, whereby said data derived from execution of said another instruction by one functional unit is output from said one functional unit and input to another functional unit which executes said one instruction.

3. A method according to claim 2 in which said testing comprises receiving a first instruction in a succession of instructions, accepting consecutive instructions which pass a compatibility test and terminating the group after the last instruction to pass the compatibility test, or at a predetermined maximum number of instructions for the group.

4. A method according to claim 2 in which instructions are tested consecutively to form a succession of compatible groups, the first instruction in each group being the next instruction after the last instruction in the previous group.

5. A method according to claim 1 in which said testing of a succession of instructions include classifying each instruction in said succession dependent on functional units required for execution of that instruction and selecting a group of instructions in dependence on their classification.

6. A method according to claim 1 wherein execution of said group of instructions includes executing a plurality of said separate instructions in said group simultaneously by one or more stages of the execution unit.

7. A method according to claim 1 in which a succession of groups of instructions are issued to the execution unit in a pipelined sequence.

8. A method according to claim 7 in which instructions are obtained from a program store and decoded as a pipelined sequence prior to supplying to the execution unit.

9. A method according to claim 1 in which each stage of operation of the execution unit is effected in one execution cycle and said execution unit is operated in a pipelined manner whereby a new group of compatible instructions is fed to the execution unit in each execution cycle.

10. A method according to claim 1 wherein first and second operands are generated by one or more functional units in two stages of the execution unit, an arithmetic operation is effected by a functional unit in a third stage of the execution unit and in a fourth stage of the execution unit a result is written to a store location.

11. A method according to claim 10 wherein said execution unit is operable to execute a program jump instruction.

12. Computer apparatus comprising a microprocessor and memory for holding a sequence of instructions to be executed, said apparatus comprising pipelined circuitry comprising (I) instruction fetch circuitry for fetching instructions from said memory, (II) instruction decoding circuitry connected to receive instructions from said instruction fetch circuitry, and (III) an instruction execution unit having a plurality of functional units each operable to execute at least part of an instruction, said instruction decoding circuitry including:

classifying circuitry for identifying a sequence of instructions to be executed and classifying each instruction in the sequence after receipt by the instruction decoding circuitry in dependence on said functional units required for execution of each instruction, scanning circuitry to scan the classification of successive instructions in said sequence and selecting a selected group from said sequence which according to their classification are compatible for simultaneous issue to the instruction execution unit without conflicting demands on any function unit in the instruction execution unit, said scanning circuitry including scan logic circuits for each instruction in the sequence, the scan logic circuits being sequentially interconnected by interconnecting circuitry to provide forward and backward scanning data paths between said scan logic circuits, and instruction issuing circuitry connected to said classifying circuitry for issuing simultaneously said group of separate compatible instructions to said execution unit, said instruction issuing circuitry being connected directly to said instruction execution unit whereby said selected group of instructions pass directly from the classifying and scanning circuitry to the instruction execution unit.

13. Computer apparatus comprising a microprocessor and memory for holding a sequence of instructions to be executed, said apparatus comprising pipelined circuitry comprising (I) instruction fetch circuitry for fetching instructions from said memory, (II) instruction decoding circuitry connected to receive instructions from said instruction fetch circuitry, and (III) an instruction execution unit having a plurality of functional units each operable to execute at least part of an instruction, said decoding circuitry including classifying circuitry for classifying each instruction after receipt by the decoding circuitry in dependence on said functional units required for execution of that instruction, testing the classification of successive instructions and selecting a group which according to their classification are compatible for simultaneous issue to the execution unit without conflicting demands on any function unit in the execution unit, and instruction issuing circuitry connected to said classifying circuitry for issuing simultaneously a group of separate compatible instructions to said execution unit.

14. Computer apparatus according to claim 13 including decoding circuitry, said decoding circuitry and execution unit being arranged as a pipeline.

15. Computer apparatus according to claim 12 in which said functional units form a succession of stages in said execution unit.

16. Computer apparatus according to claim 15 in which at least one stage of the execution unit has a plurality of functional units arranged to execute respective instructions simultaneously.

17. Computer apparatus according to claim 16 including decoding circuitry, said decoding circuitry and execution unit being arranged as a pipeline.

18. Computer apparatus according to claim 15 including decoding circuitry, said decoding circuitry and execution unit being arranged as a pipeline.

19. Computer apparatus according to claim 12 including decoding circuitry, said decoding circuitry and execution unit being arranged as a pipeline.

20. The computer apparatus according to claim 12 wherein said scanning circuitry comprises circuitry separate from but connected to said instruction issuing circuitry.

\* \* \* \* \*

UNITED STATES PATENT AND TRADEMARK OFFICE
CERTIFICATE OF CORRECTION

PATENT NO.   : 5,742,783
DATED        : April 21, 1998
INVENTOR(S)  : Saeid Azmoodeh et al.

It is certified that error appears in the above-identified patent and that said Letters Patent is hereby corrected as shown below:

<u>Title page,</u>
Item [73], Assignee should read as follows:
-- SGS-Thomson Microelectronics, Ltd., United Kingdom (GB) --

Signed and Sealed this

Twentieth Day of May, 2003

JAMES E. ROGAN
*Director of the United States Patent and Trademark Office*